(12) United States Patent
Inagawa

(10) Patent No.: US 10,543,835 B2
(45) Date of Patent: Jan. 28, 2020

(54) HYBRID VEHICLE

(71) Applicant: Toyota Jidosha Kabushiki Kaisha, Toyota-shi (JP)

(72) Inventor: Tomokazu Inagawa, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 80 days.

(21) Appl. No.: 15/844,805

(22) Filed: Dec. 18, 2017

(65) Prior Publication Data

US 2018/0178779 A1 Jun. 28, 2018

(30) Foreign Application Priority Data

Dec. 26, 2016 (JP) ................. 2016-251768

(51) Int. Cl.
| | | |
|---|---|---|
| *B60W 20/40* | (2016.01) | |
| *F16D 41/00* | (2006.01) | |
| *F16H 57/04* | (2010.01) | |
| *B60K 6/445* | (2007.10) | |
| *B60K 6/387* | (2007.10) | |
| *F16D 48/06* | (2006.01) | |

(52) U.S. Cl.
CPC ............ *B60W 20/40* (2013.01); *B60K 6/387* (2013.01); *F16D 41/00* (2013.01); *F16D 48/06* (2013.01); *B60W 2510/10* (2013.01); *B60W 2710/021* (2013.01); *B60Y 2200/92* (2013.01); *B60Y 2300/192* (2013.01); *B60Y 2300/424* (2013.01); *F16H 57/04* (2013.01); *Y10S 903/914* (2013.01)

(58) Field of Classification Search
USPC .......................................................... 701/22
See application file for complete search history.

(56) References Cited

U.S. PATENT DOCUMENTS

| | | | | |
|---|---|---|---|---|
| 2010/0075798 A1* | 3/2010 | Suzuki | ..................... | B60K 6/40 |
| | | | | 477/5 |
| 2010/0228451 A1* | 9/2010 | Hosoya | ............... | F16H 61/0031 |
| | | | | 701/51 |
| 2010/0228452 A1* | 9/2010 | Hosoya | ............... | F16H 61/0031 |
| | | | | 701/51 |
| 2013/0124027 A1* | 5/2013 | Tanishima | ............... | B60K 6/48 |
| | | | | 701/22 |

(Continued)

FOREIGN PATENT DOCUMENTS

| | | |
|---|---|---|
| JP | 8-324262 A | 12/1996 |
| JP | 2011-37329 A | 2/2011 |

(Continued)

*Primary Examiner* — Tyler D Paige
(74) *Attorney, Agent, or Firm* — Oblon, McClelland, Maier & Neustadt, L.L.P.

(57) ABSTRACT

A hybrid vehicle is provided. In the hybrid vehicle an oil pump can be driven while stopping an engine without a device for interrupting torque transmission between a power split device and the engine. A differential mechanism includes a first rotary element to which torque is delivered from the engine, a second rotary element connected to drive wheels, and a third rotary element to which torque is delivered from the first motor. Torque transmission between the first motor and the third rotary element is interrupted by a clutch. A mechanical oil pump is driven by any one of the first input shaft and the second input shaft that is rotated higher than the other one.

19 Claims, 20 Drawing Sheets

(56) References Cited

U.S. PATENT DOCUMENTS

| | | | | |
|---|---|---|---|---|
| 2013/0231815 A1* | 9/2013 | Tanishima | ............... | B60K 6/48 |
| | | | | 701/22 |
| 2013/0297135 A1* | 11/2013 | Yamanaka | ............... | B60K 6/48 |
| | | | | 701/22 |
| 2015/0337953 A1* | 11/2015 | Kasuya | .................... | B60K 6/48 |
| | | | | 192/219.5 |
| 2015/0360682 A1* | 12/2015 | Ooshima | .................. | B60K 6/48 |
| | | | | 701/22 |
| 2018/0178779 A1* | 6/2018 | Inagawa | ................ | B60K 6/445 |

FOREIGN PATENT DOCUMENTS

| | | |
|---|---|---|
| JP | 2012-144172 A | 8/2012 |
| JP | 2013-252734 A | 12/2013 |
| JP | 2015-54579 A | 3/2015 |
| JP | 2016-130115 A | 7/2016 |
| JP | 2016-150674 | 8/2016 |
| WO | WO 2016/132203 A1 | 8/2016 |

\* cited by examiner

HYBRID VEHICLE

CROSS-REFERENCE TO RELATED APPLICATIONS

The present disclosure claims the benefit of Japanese Patent Application No. 2016-251768 filed on Dec. 26, 2016 with the Japanese Patent Office, the disclosures of which are incorporated herein by reference in its entirety.

BACKGROUND

Field of the Disclosure

Embodiments of the present disclosure relate to the art of a hybrid vehicle having an engine, a motor and a mechanical oil pump.

Discussion of the Related Art

JP-A-2016-150674 describes a hybrid vehicle including a power split device for distributing engine power to a first motor and drive wheels. In the hybrid vehicle taught by JP-A-2016-150674, a transmission is disposed between the engine and the power split device, and a speed ratio of the transmission is set to "1" by engaging a clutch and reduced from "1" by engaging a brake. According to the teachings of JP-A-2016-150674, a rotary element connected to the transmission is connected to a mechanical oil pump so that the mechanical oil pump is driven even when the engine is stopped. Specifically, the mechanical oil pump is driven by the first motor while stopping the engine and disengaging the clutch and the brake to interrupt torque transmission between the power split device and the engine.

In the hybrid vehicle taught by JP-A-2016-150674, since torque transmission between the power split device and the engine may be interrupted, the engine may be stopped during propulsion by a second motor while operating the mechanical oil at an appropriate speed. However, the teachings of JP-A-2016-150674 may not be applied to a vehicle which does not have the transmission adapted to interrupt torque transmission between the power split device and the engine.

SUMMARY

Aspects of embodiments of the present disclosure have been conceived noting the foregoing technical problems, and it is therefore an object of the present disclosure is to provide a hybrid vehicle in which a mechanical oil pump can be driven while stopping an engine without a device for interrupting torque transmission between a power split device and the engine.

The present disclosure relates to a hybrid vehicle comprising: an engine; a first motor; a differential mechanism including a first rotary element to which torque is delivered from the engine, a second rotary element connected to drive wheels, and a third rotary element to which torque is delivered from the first motor; and a second motor that applies torque to a power transmitting route between the second rotary element and the drive wheels. An operating mode of the hybrid vehicle may be switched between a hybrid mode in which an output torque of the engine is delivered to the drive wheels through the differential mechanism to propel the hybrid vehicle, and an electric vehicle mode in which an output torque of the second motor is delivered to the drive wheels to propel the hybrid vehicle while stopping the engine. The hybrid vehicle further comprises: a clutch that selectively interrupts torque transmission between the first motor and the third rotary element; a first input shaft connected to any one of the rotary elements of the differential mechanism; a second input shaft connected to the first motor; and a mechanical oil pump that is driven by the torque applied from any one of the first input shaft and the second input shaft that is rotated at a speed higher than that of the other one.

In a non-limiting embodiment, the mechanical oil pump may include: a first one-way clutch that is engaged to transmit torque when the first input shaft is rotated in a predetermined direction; a second one-way clutch that is engaged to transmit torque when the second input shaft is rotated in a predetermined direction; and a driveshaft that is connected to the first input shaft through the first one-way clutch, and that is connected to the second input shaft through the second one-way clutch.

In a non-limiting embodiment, an engagement direction of the first one-way clutch and an engagement direction of the second one-way clutch may be identical to each other.

In a non-limiting embodiment, the hybrid vehicle may further comprise a controller that controls the clutch and the first motor. In addition, the first input shaft may be connected to the second rotary element.

In a non-limiting embodiment, the controller may be further configured to: determine whether or not a discharge amount of oil discharged from the mechanical oil pump by driving the mechanical oil pump by torque of the first input shaft is greater than a required discharge amount of the oil discharged from the mechanical oil pump during propulsion in the electric vehicle mode; and disengage the clutch and stop the first motor in a case that the discharge amount of oil discharged from the mechanical oil pump by driving the mechanical oil pump by the torque of the first input shaft during propulsion in the electric vehicle mode is greater than the required discharge amount of the oil discharged from the mechanical oil pump.

In a non-limiting embodiment, the controller may be further configured to: determine whether or not oil supply from the mechanical oil pump is required; and disengage the clutch and stop the first motor in a case that oil supply from the mechanical oil pump is not required.

In a non-limiting embodiment, the controller may be further configured to: determine whether or not a discharge amount of the oil discharged from the mechanical oil pump in a case of engaging the clutch is greater than the required discharge amount of the oil discharged from the mechanical oil pump; and disengage the clutch and drive the first motor in a case that the discharge amount of the oil discharged from the mechanical oil pump in the case of engaging the clutch is smaller than the required discharge amount of the oil discharged from the mechanical oil pump.

In a non-limiting embodiment, the controller may be further configured to: determine whether or not a speed of the first motor in the case of engaging the clutch falls within a predetermined range determined based on a natural vibration frequency of the first motor; and disengage the clutch and drive the first motor in a case that the speed of the first motor in the case of engaging the clutch falls within the predetermined range.

In a non-limiting embodiment, the clutch may include a first rotary member connected to the first motor, and a second rotary member connected to the third rotary element. In addition, a torque transmitting capacity between the first rotary member and the second rotary member may be variable.

In a non-limiting embodiment, the controller may be further configured to: determine whether or not a torque transmitting capacity of the clutch can be adjusted by causing a slip between the first rotary member and the second rotary member; and start the engine by engaging the first rotary member with the second rotary member after synchronizing a speed of the first rotary member with a speed of the second rotary member by controlling a speed of the first motor, and thereafter increasing a speed of the engine to a predetermined speed by controlling the speed of the first motor, in a case that the torque transmitting capacity of the clutch cannot be adjusted.

In a non-limiting embodiment, the controller may be further configured to: determine whether or not a speed difference between the first rotary member and the second rotary member is equal to or greater than a threshold value; and start the engine by engaging the first rotary member with the second rotary member after synchronizing a speed of the first rotary member with a speed of the second rotary member by controlling a speed of the first motor, and thereafter increasing a speed of the engine to a predetermined speed by controlling the speed of the first motor, in a case that the speed difference between the first rotary member and the second rotary member is equal to or greater than the threshold value.

In a non-limiting embodiment, the controller may be further configured to: determine whether or not the engine is required to be started promptly; and start the engine by engaging the clutch while maintaining a current speed of the first motor, and thereafter changing the speed of the first motor in such a manner as to raise the speed of the engine to an engine starting speed, in a case that the engine is required to be started promptly.

In a non-limiting embodiment, the controller may be further configured to: determine whether or not the engine is required to be started promptly; and start the engine by changing the speed of the first motor to a target speed to start the engine while disengaging the clutch, and thereafter engaging the clutch while maintaining the speed of the first motor to the target speed, in a case that the engine is not required to be started promptly.

As described, according to the embodiment of the present disclosure, the operating mode of the hybrid vehicle may be switched between a hybrid mode in which an output torque of the engine is delivered to the drive wheels through the differential mechanism to propel the hybrid vehicle, and an electric vehicle mode in which an output torque of the second motor is delivered to the drive wheels to propel the hybrid vehicle while stopping the engine. During propulsion in the hybrid mode, the mechanical oil pump can be driven by the torque applied from any one of the first input shaft and the second input shaft that is rotated at a speed higher than that of the other one. During propulsion in the electric vehicle mode, the mechanical oil pump can be driven by the torque applied from the second input shaft while disengaging the clutch and stopping the engine. Thus, in the hybrid vehicle according to the embodiment of the present disclosure, the engine is connected to the power split device but the mechanical oil pump may be driven in every situation irrespective of the operating mode.

BRIEF DESCRIPTION OF THE DRAWINGS

Features, aspects, and advantages of exemplary embodiments of the present disclosure will become better understood with reference to the following description and accompanying drawings, which should not limit the disclosure in any way.

DETAILED DESCRIPTION OF THE PREFERRED EMBODIMENT(S)

Figure 1:
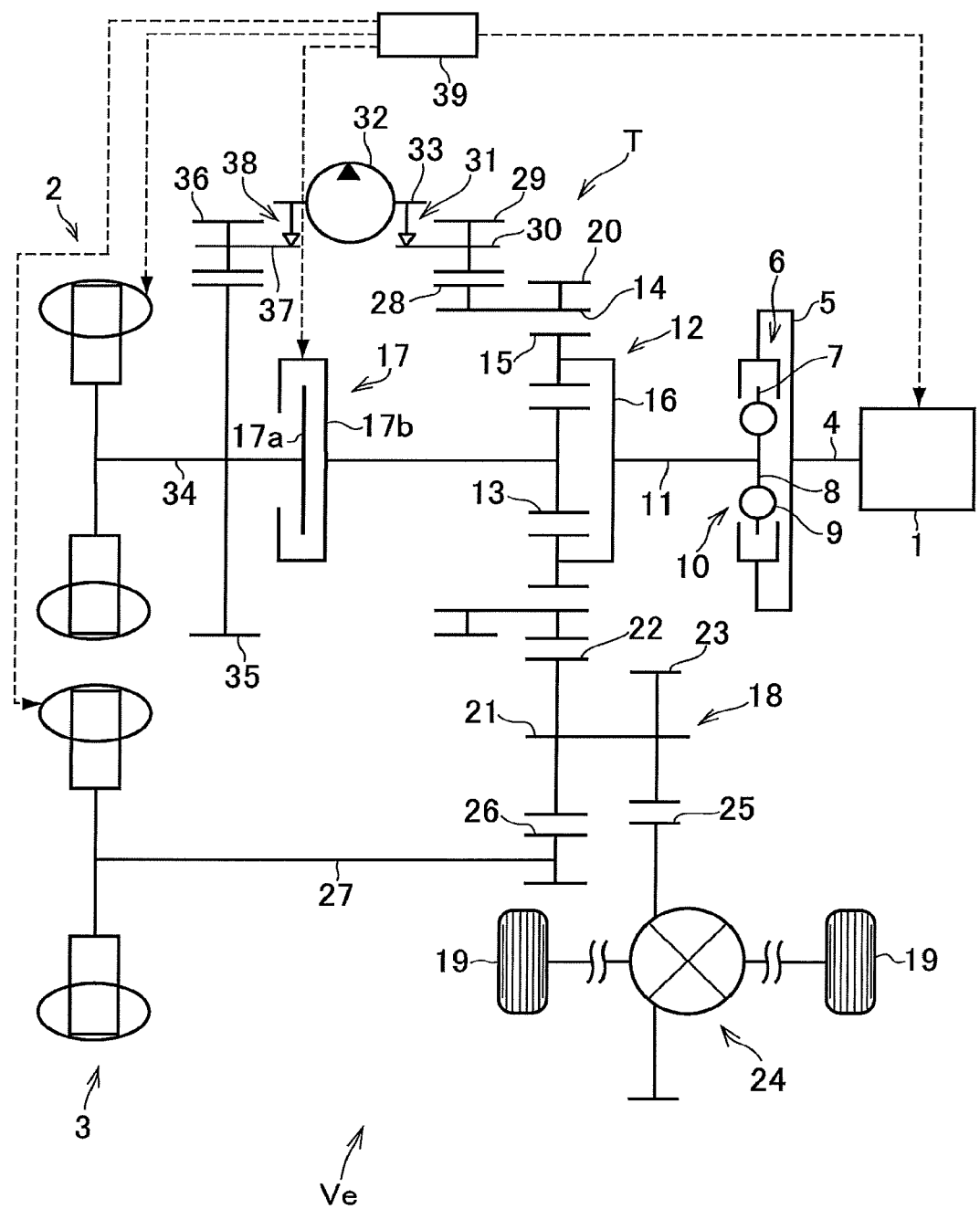
FIG. 1 is a schematic illustration showing one example of a structure of the hybrid vehicle according to the present disclosure.

Preferred embodiments of the present application will now be explained with reference to the accompanying drawings. Referring now to FIG. 1, there is shown one example of a structure of a hybrid vehicle (as will be simply called the "vehicle" hereinafter) Ve according to the present disclosure. A prime mover of the vehicle Ve includes an engine 1, a first motor (referred to as "MG1" in the drawings) 2, and a second motor (referred to as "MG2" in the drawings) 3. For example, a gasoline engine and a diesel engine may be used as the engine 1, and a motor-generator such as a permanent magnet synchronous motor and an induction motor may be used as the first motor 2 and the second motor 3.

An output shaft 4 of the engine 1 is connected to a flywheel 5, and a torque limiter 6 is connected to the flywheel 5 to limit a transmission torque. The torque limiter 6 includes a dry clutch that pushes an annular rotary member 7 onto the flywheel 5 by a diaphragm spring. When a torque greater than an upper limit torque to the flywheel 5 or the rotary member 7, torque transmission between the flywheel 5 and the rotary member 7 is interrupted to prevent an excessive torque transmission.

An output member 8 is held in the rotary member 7 while being allowed to rotate relatively to the rotary member 7, and a plurality of coil springs 9 are interposed between the rotary member 7 and the output member 8 to elastically transmit torque of the rotary member 7 to the output member 8. Thus, the rotary member 7, the output member 8, and the coil springs 9 form a spring damper 10 so that the torque of the rotary member 7 is transmitted to the output member 8 while suppressing pulsation.

The output member 8 is connected to an input shaft 11 of a transmission T, and the input shaft 11 is connected to a power split device 12 as a single-pinion planetary gear unit. Accordingly, the power split device 12 serves as a "differential mechanism" of the embodiment. The power split device 12 includes: a sun gear 13 as a third rotary element; a ring gear 14 as a second rotary element arranged concentrically with the sun gear 13; a plurality of planetary gears 15 interposed between the sun gear 13 and the ring gear 14 while keeping predetermined intervals; and a carrier 16 as a first rotary element that supports the planetary gears 15 while allowing to revolve around the sun gear 13.

The carrier 16 is connected to the input shaft 11, the sun gear 13 is connected to the first motor 2 through a clutch 17, and the ring gear 14 is connected to drive wheels 19 through a gear train 18. Thus, torque of the engine 1 and torque of the first motor 2 are delivered to the sun gear 13, and the ring gear 14 is connected the drive wheels 19 to transmit torque therebetween. Specifically, the torque of the engine 1 is delivered to the drive wheels 19 though the power split device 12 by establishing a reaction torque by the first motor 2. In this situation, the first motor 2 generates torque in a direction to reduce a speed thereof in most cases so that power of the engine 1 is partially converted into electric power by the first motor 2.

In the vehicle Ve, a double-pinion planetary gear unit may also be used as the power split device 12 instead of the single-pinion planetary gear unit. In this case, in the double-pinion planetary gear unit, a ring gear is connected to the engine 1, a carrier is connected to the drive wheels 19, and a sun gear is connected to the first motor 2 through the clutch 17. Alternatively, a Ravigneaux planetary gear unit having four rotary elements may also be used as the power split device 12 instead of the single-pinion planetary gear unit.

The ring gear 14 has a predetermined length in an axial direction, and first external teeth 20 are formed on an outer circumferential face of one end of the ring gear 14. A counter driven gear 22 is fitted onto one end of a countershaft 21 extending parallel to the input shaft 11 while meshing with the first external teeth 20 of the ring gear 14, and a counter drive gear 23 is fitted onto other end of the countershaft 21 while meshing with a ring gear 25 of a differential gear unit 24 to transmit power to the drive wheels 19.

The second motor 3 is arranged between the ring gear 14 and the drive wheels 19 in such a manner that an output shaft 27 of the second motor 3 extends parallel to the countershaft 21, and an output gear 26 is fitted onto a leading end of the output shaft 27 to be meshed with the counter driven gear 22.

Second external teeth 28 are formed on an outer circumferential face of other end of the ring gear 14, and a first pinion gear 29 fitted onto one end of a first input shaft 30 is meshed with the second external teeth 28. Other end of the first input shaft 30 is connected to a driveshaft 33 of a mechanical oil pump (to be abbreviated as the "MOP" hereinafter) 32 through a first one-way clutch (to be abbreviated as the "first OWC" hereinafter) 31.

An output gear 35 is fitted onto the output shaft 34 of the first motor 2, and a second pinion gear 36 is fitted onto one end of a second input shaft 37 extending coaxially with the first pinion gear 29 to be meshed with the output gear 35. Other end of the second input shaft 37 is connected to the driveshaft 33 of the MOP 32 through a second one-way clutch (to be abbreviated as the "second OWC" hereinafter) 38. The first OWC 31 is brought into engagement when the first input shaft 30 is rotated in the counter direction to a rotational direction of the engine 1 (as will be simply called the "counter direction" hereinafter) to apply torque to the driveshaft 33. Likewise, the second OWC 38 is brought into engagement when the second input shaft 37 is rotated in the counter direction to apply torque to the driveshaft 33. That is, the first OWC 31 is brought into engagement when the ring gear 14 is rotated in the rotational direction of the engine 1 (as will be simply called the "forward direction" hereinafter) to apply torque to the driveshaft 33. Likewise, the second OWC 38 is brought into engagement when the first motor 2 is rotated in the forward direction to apply torque to the driveshaft 33.

Thus, the first input shaft 30 is connected to the driveshaft 33 through the first OWC 31, and the second input shaft 37 is connected to the driveshaft 33 through the second OWC 38. In addition, the engagement direction of the first OWC 31 to engage the first input shaft 30 with the driveshaft 33 and the engagement direction of the second OWC 38 to engage the second input shaft 37 with the driveshaft 33 are identical to each other. That is, when the first input shaft 30 is rotated at a speed higher than a rotational speed of the second input shaft 37, the first OWC 31 is brought into engagement so that the first input shaft 30 is rotated integrally with the driveshaft 33. In this situation, the second input shaft 37 is rotated at a speed lower than a rotational speed of the driveshaft 33 and hence the second OWC 38 is not brought into engagement. By contrast, when the second input shaft 37 is rotated at a speed higher than a rotational speed of the first input shaft 30, the second OWC 38 is brought into engagement so that the second input shaft 37 is rotated integrally with the driveshaft 33. In this situation, the first input shaft 30 is rotated at a speed lower than a rotational speed of the driveshaft 33 and hence the first OWC 31 is not brought into engagement. That is, torque is applied to the MOP 32 from one of the first input shaft 30 and the second input shaft 37 rotated at the higher speed in the counter direction. When such relation between the rotational speeds of the first input shaft 30 and the second input shaft 37 is altered, the input shaft applying the torque to the MOP 32 is switched automatically.

In order to selectively interrupt torque transmission between the output shaft 34 of the first motor 2 and the sun gear 13, a clutch 17 is disposed on the output shaft 34. The clutch 17 includes a first rotary member 17a connected to the first motor 2 and a second rotary member 17b connected to the sun gear 13. The clutch 17 is actuated hydraulically or electromagnetically, and a torque transmitting capacity of the clutch 17 is changed by controlling a contact pressure between the first rotary member 17a and the second rotary member 17b. When the clutch 17 is in disengagement, the torque will not be transmitted to the drive wheels 19 through the power split device 12. In this situation, therefore, the vehicle Ve is allowed to be powered by the second motor 3 while stopping the engine 1. In addition, a speed of the first motor 2 may be altered arbitrarily in this situation.

In order to electrically control the engine 1, the first motor 2, the second motor 3, the clutch 17 and so on, the vehicle Ve is provided with an electronic control unit (to be abbreviated as the "ECU" hereinafter) 39 as a controller. The ECU 39 is composed mainly of a microcomputer, and data from an accelerator sensor for detecting an accelerator position, a vehicle speed sensor for detecting a vehicle speed, a shift position sensor for detecting a shift position, an SOC sensor for detecting a state of charge (to be abbreviated as the "SOC" hereinafter) level of a battery connected to the motors 2 and 3, an engine speed sensor for detecting an engine speed, a motor speed sensor for detecting speeds of the motors 2 and 3 (those sensors are not shown) are sent to the ECU 39. The ECU 39 executes calculation based on the incident data using maps and formulas installed in advance, and transmits calculation result in the form of command signal. For example, the ECU 39 transmits command signals of an ignition timing of the engine 1, a fuel injection amount, current values and voltage values of the electricity supplied to the motors 2 and 3, a hydraulic value or a current value to engage the clutch 17 and so on.

An operating mode of the vehicle Ve may be selected from hybrid vehicle mode (to be abbreviated as the "HV mode" hereinafter) in which an output torque of the engine 1 is delivered to the drive wheels 19 through the power split device 12 to propel the vehicle Ve, and an electric vehicle mode (to be abbreviated as the "EV mode" hereinafter) in which an output torque of the second motor 3 is delivered to the drive wheels 19 to propel the vehicle Ve while stopping the engine 1. In any of the operating mode, the MOP 32 may be driven even when the vehicle Ve is stopped. Conditions of the vehicle Ve in each operating mode, and rotational speeds of the rotary elements of the power split device 12 and the first motor 2 are indicated in FIGS. 2 to 10. In the following explanations, the nomographic diagrams shown in FIGS. 2 to 10 will be explained on the assumption that a gear ratio between the second external teeth 28 and the first pinion gear 29, and a gear ratio between the output gear 35 and the second pinion gear 36 are "1", for the sake of explanation.

Figure 2:
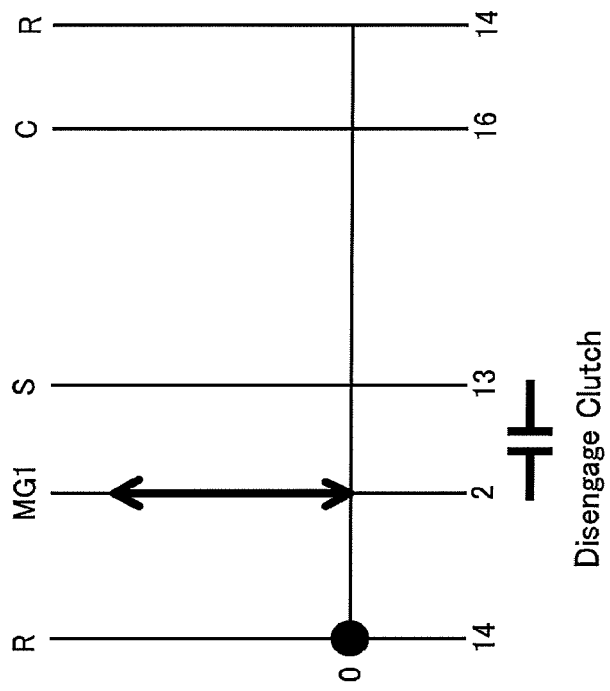
FIG. 2 shows a table indicating conditions of the vehicle and a nomographic diagram indicating speeds of the rotary elements when the vehicle is stopped while driving the mechanical oil pump and disengaging the clutch.

FIG. 2 shows an example of driving the MOP 32 when the vehicle Ve is stopped while stopping the engine 1. As described, the ring gear 14 is connected to the drive wheels 19 through the gear train 18, and hence a rotation of the ring gear 14 is stopped when the vehicle Ve is stopped. In this situation, therefore, torque may not be applied to the MOP 32 from the ring gear 14. As also described, the second motor 3 is also connected to the drive wheels 19 through the counter driven gear 22 and so on, and hence rotations of the second motor 3 and the rotary elements 13, 14, and 15 of the power split device 12 are also stopped when the vehicle Ve is stopped while stopping the engine 1.

In this situation, the MOP 32 may be required to be driven for the purpose of cooling gears of the gear train 18 and the power split device 12. To this end, the clutch 17 is disengaged to drive the power split device 12 and the first motor 2 separately. In other words, the clutch 17 is disengaged to allow the first motor 2 to be rotated at a desired speed while stopping the engine 1 in the stopping vehicle Ve.

In this case, the MOP 32 is allowed to be driven by the torque applied from the second input shaft 37 while stopping the engine 1, by thus disengaging the clutch 17 while adjusting the rotational speed of the first motor 2.

Figure 3:
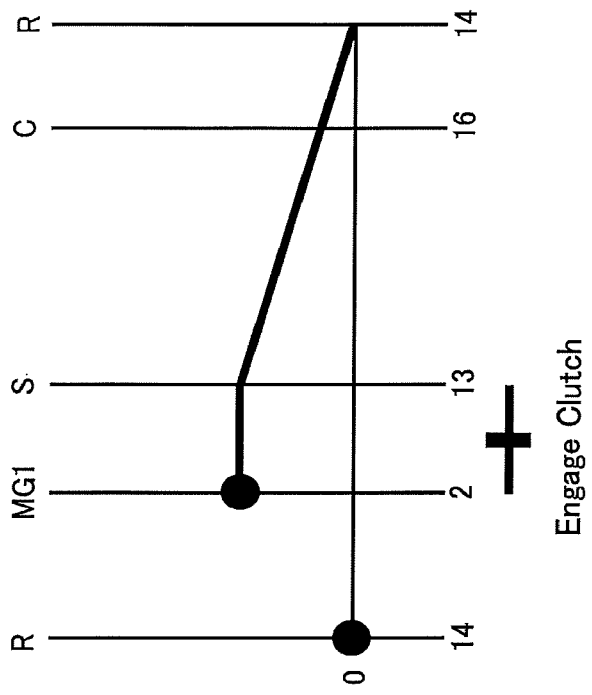
FIG. 3 shows a table indicating conditions of the vehicle and a nomographic diagram indicating speeds of the rotary elements when the vehicle is stopped while driving the mechanical oil pump and engaging the clutch.

If the SOC level of the battery is low in the stopping vehicle Ve, the battery may be charged by activating the engine 1 to operate the first motor 2 as a generator by the engine 1. FIG. 3 shows a situation in which the battery is charged in the stopping vehicle Ve by activating the engine 1 to operate the first motor 2 as a generator. As described, when the vehicle Ve is stopped, the torque cannot be applied to the MOP 32 from the ring gear 14, and the rotations of the second motor 3 and the power split device 12 are also stopped.

As described, in the case of charging the battery in the stopping vehicle Ve, the first motor 2 is driven to serve as a generator by activating the engine 1. In this situation, the MOP 32 may also be required to be driven for the purpose of cooling gears of the gear train 18 and the power split device 12. When charging the battery while driving the MOP 32 in the stopping vehicle Ve, the engine 1 generates power not only to charge the battery but also to drive the MOP 32. In this case, the clutch 17 is engaged to apply the power to the first motor 2.

In this case, the first motor 2 generates torque to maintain a speed of the first motor 2 at a speed possible keep a speed of the engine 1 to an optimally fuel efficient speed in accordance with a gear ratio of the power split device 12. To this end, specifically, the first motor 2 generates the torque in the forward direction to reduce the speed of the first motor 2, and consequently the first motor 2 generates electricity. In this situation, accordingly, the power of the engine 1 delivered to the output shaft 34 of the first motor 2 through the clutch 17 is partially delivered to the driveshaft 33 through the second input shaft 37 to drive the MOP 32.

Thus, in the stopping vehicle Ve, the first motor 2 is allowed not only to charge the battery but also to drive the MOP 32 by activating the engine 1 while engaging the clutch 17.

Figure 4:
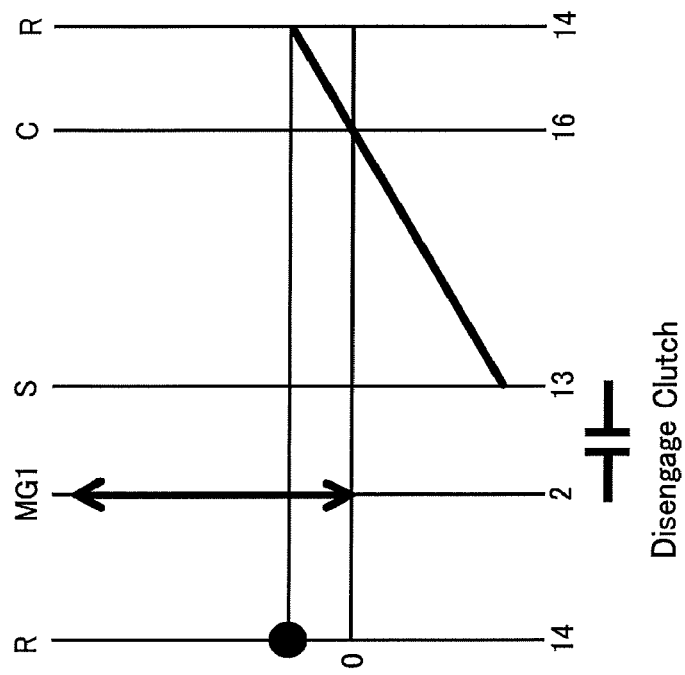
FIG. 4 shows a table indicating conditions of the vehicle and a nomographic diagram indicating speeds of the rotary elements when the vehicle is propelled in the EV mode while driving the mechanical oil pump and disengaging the clutch.

FIG. 4 shows a situation in which the MOP 32 is driven during forward propulsion of the vehicle Ve in the EV mode while stopping the engine 1 and disengaging the clutch 17. In this case, the torque may be applied to the MOP 32 from the first input shaft 30 or the second input shaft 37. In the situation shown in FIG. 4, the ring gear 14 is rotated at a speed in accordance with the vehicle speed, and the second motor 3 is rotated at the forward direction to propel the vehicle Ve. In the EV mode, since the engine 1 is stopped, the sun gear 13 is rotated in the counter direction at a speed governed by the rotational speed of the ring gear 14 and the gear ratio of the power split device 12. In this situation, since the clutch 17 is in disengagement, the sun gear 13 and the first motor 2 are allowed to rotate relatively to each other.

In the situation shown in FIG. 4, if the rotational speed of the first motor 2 is lower than the rotational speed of the ring gear 14, the MOP 32 is driven by the torque applied from the first input shaft 30. By contrast, if the rotational speed of the first motor 2 is higher than the rotational speed of the ring gear 14, the MOP 32 is driven by the torque applied from the second input shaft 37.

Figure 5:
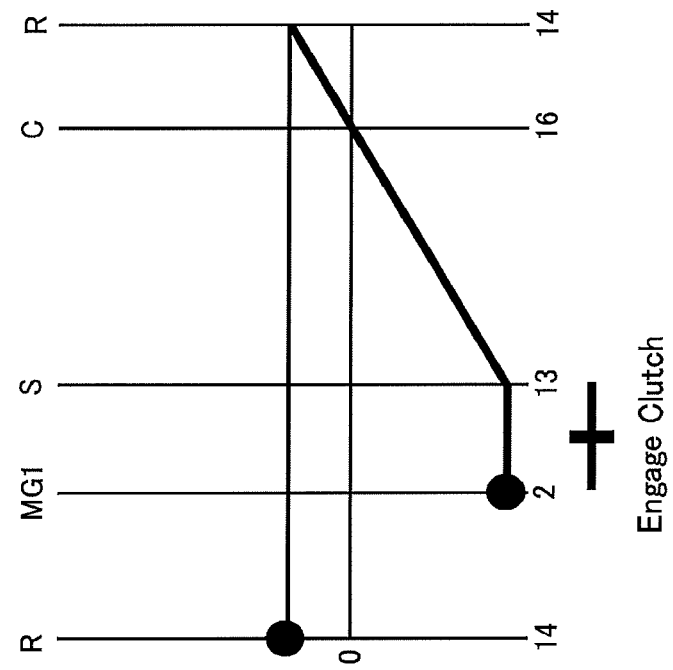
FIG. 5 shows a table indicating conditions of the vehicle and a nomographic diagram indicating speeds of the rotary elements when the vehicle is propelled in the EV mode while driving the mechanical oil pump and engaging the clutch.

For example, in the EV mode, the clutch 17 would be kept in engagement when mechanical failure occurs in the clutch 17. In addition, in the EV mode, the clutch 17 may be engaged for the preparation of cranking of the engine 1 to shift the operating mode to the HV mode. The situation of such cases during forward propulsion in the EV mode is shown in FIG. 5. In the situation shown in FIG. 5, the ring gear 14 is also rotated at a speed in accordance with the vehicle speed, and the second motor 3 is also rotated at the forward direction to propel the vehicle Ve. Likewise, the sun gear 13 is also rotated in the counter direction at the speed governed by the rotational speed of the ring gear 14 and the gear ratio of the power split device 12. However, since the clutch 17 is in engagement, the first motor 2 is rotated integrally with the sun gear 13. In this situation, current supply to the first motor 2 is stopped and hence the first motor 2 is idled in the counter direction. In the situation shown in FIG. 5, therefore, the torque will not be applied to the MOP 32 from the first motor 2, but applied to the MOP 32 from the ring gear 14 thorough the ring gear 14.

Figure 6:
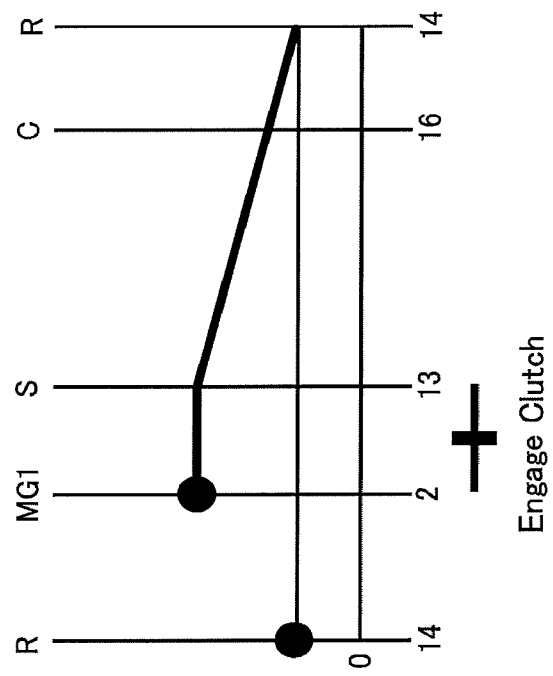
FIG. 6 shows a table indicating conditions of the vehicle and a nomographic diagram indicating speeds of the rotary elements when the vehicle is propelled in the HV mode at a low speed while driving the mechanical oil pump.

FIG. 6 shows a situation in which the MOP 32 is driven during forward propulsion of the vehicle Ve in the HV mode at a low speed. In this case, since the vehicle speed is low, the ring gear 14 is rotated at a relatively low speed. On the other hand, the engine 1 is operated at a speed that is determined based on a required drive force in line with an optimally fuel efficient curve, and that is higher than the speed of the ring gear 14. In this situation, the sun gear 13 is also rotated at the speed governed by the rotational speeds of the ring gear 14 and the carrier 16, and the gear ratio of the power split device 12. The rotational speed of the sun gear 13 of this case is higher than those of the ring gear 14 and the carrier 16. As described, in order to deliver the torque of the engine 1 to the drive wheels 19, the first motor 2 generates a reaction torque and the clutch 17 is engaged. Consequently, the first motor 2 is rotated at a same speed as the sun gear 13. Thus, in the situation shown in FIG. 6, the first motor is rotated at the speed higher than that of the ring gear 14 in the forward direction so that the torque is applied to the MOP 32 from the first input shaft 30.

Figure 7:
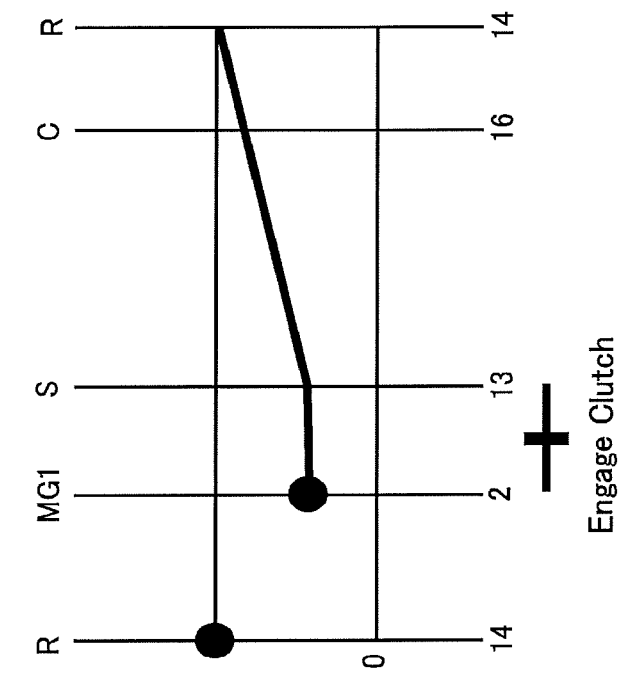
FIG. 7 shows a table indicating conditions of the vehicle and a nomographic diagram indicating speeds of the rotary elements when the vehicle is propelled in the HV mode at a high speed while driving the mechanical oil pump.

FIG. 7 shows a situation in which the MOP 32 is driven during forward propulsion of the vehicle Ve in the HV mode at a high speed. In this case, the ring gear 14 is rotated at a speed higher than that of the engine, and the sun gear 13 is rotated at a speed lower than that of the carrier 16. In the situation shown in FIG. 7, therefore, the torque of the ring gear 14 is applied to the MOP 32 from the first input shaft 30.

Figure 8:
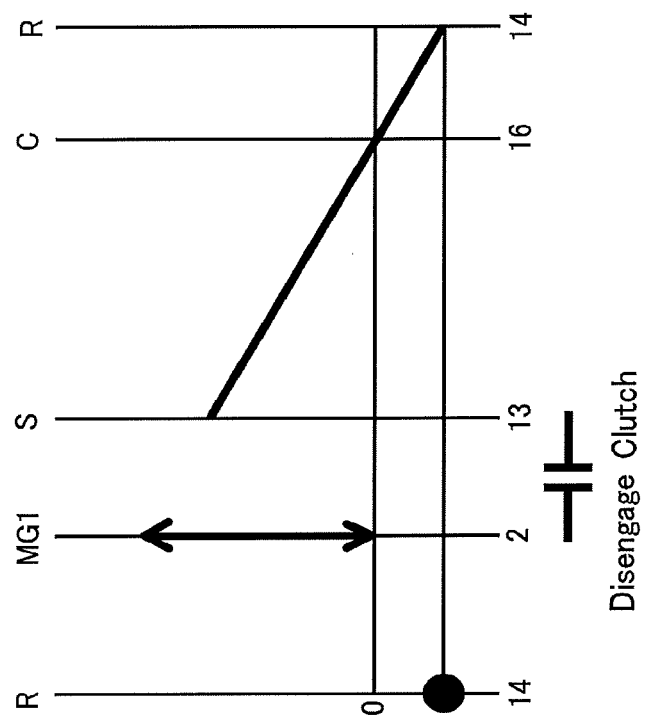
FIG. 8 shows a table indicating conditions of the vehicle and a nomographic diagram indicating speeds of the rotary elements when the vehicle is propelled in the EV mode in the reverse direction while driving the mechanical oil pump and disengaging the clutch.

The MOP 32 may also be driven even during reverse propulsion of the vehicle Ve. FIG. 8 shows a situation in which the MOP 32 is driven during reverse propulsion of the vehicle Ve in the EV mode while stopping the engine 1 and disengaging the clutch 17. When propelling the vehicle Ve in the reverse direction, the drive wheels 19 are rotated in the backward direction and hence the second motor 3 and the ring gear 14 are rotated in the counter direction. In this situation, since the rotation of the carrier 16 is stopped, the sun gear 13 is rotated in the opposite direction to the rotational direction of the ring gear 14. That is, the sun gear 13 is rotated in the forward direction at a speed governed by the rotational speed of the rig gear 14 and the gear ratio of the power split device 12.

In the situation shown in FIG. 8, since the ring gear 14 is rotated in the counter direction, the torque will not be delivered to the MOP 32 from the ring gear 14. In this situation, therefore, the first motor 2 is rotated in the forward direction to apply torque to the MOP 32 through the second input shaft 37. In this case, since the first motor 2 and the sun gear 13 are allowed to rotate relatively to each other, the first motor 2 is rotated at a speed to drive the MOP 32 properly.

Figure 9:
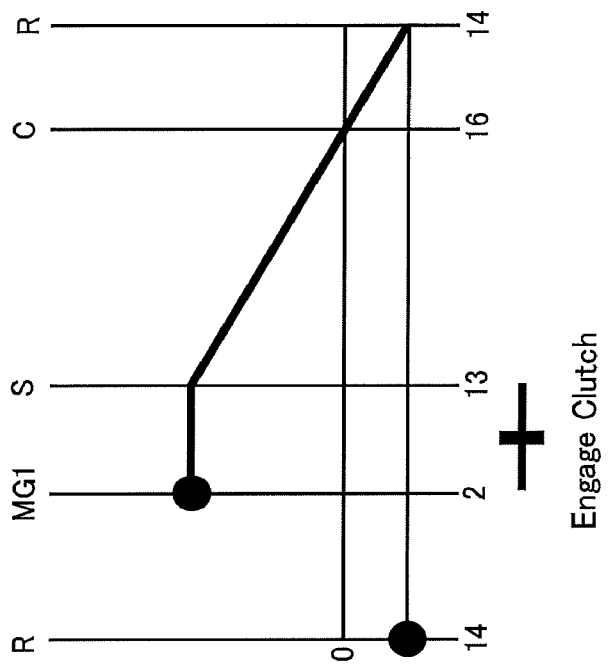
FIG. 9 shows a table indicating conditions of the vehicle and a nomographic diagram indicating speeds of the rotary elements when the vehicle is propelled in the EV mode in the reverse direction while driving the mechanical oil pump and engaging the clutch.

FIG. 9 shows a situation in which the MOP 32 is driven during reverse propulsion of the vehicle Ve in the EV mode while stopping the engine 1 and engaging the clutch 17. In this case, the second motor 3 generates power not only to propel the vehicle Ve but also to drive the MOP 32. Specifically, the output power of the second motor 3 is partially delivered to the MOP 32 through the sun gear 13, the clutch 17, the output shaft 34 of the first motor 2, the output gear 35, and the second input shaft 37.

Figure 10:
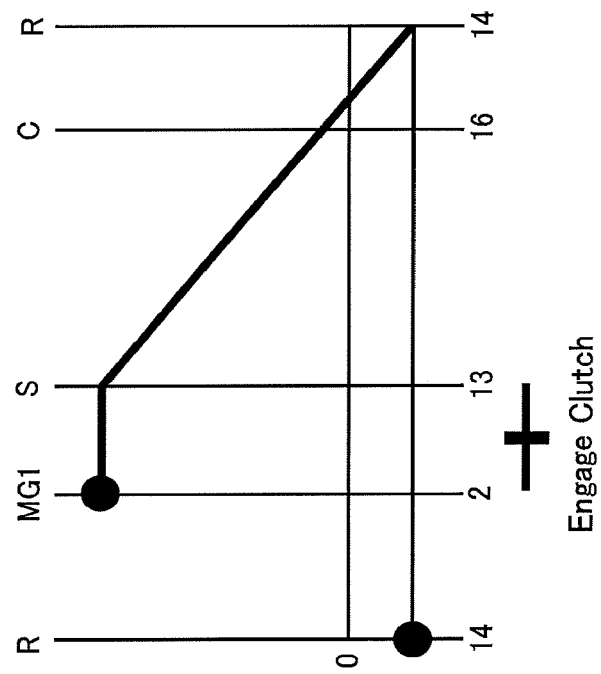
FIG. 10 shows a table indicating conditions of the vehicle and a nomographic diagram indicating speeds of the rotary elements when the vehicle is propelled in the HV mode in the reverse direction while driving the mechanical oil pump.

FIG. 10 shows a situation in which the MOP 32 is driven during reverse propulsion of the vehicle Ve in the HV mode. In the situation shown in FIG. 10, the engine 1 is activated and the ring gear 14 is rotated in the counter direction in accordance with the vehicle speed. In this situation, the sun gear 13 is rotated in the forward direction at a speed governed by the rotational speeds of the carrier 16 and the ring gear 14, and the gear ratio of the power split device 12. In this case, since the vehicle Ve is powered by the engine 1, the clutch 17 is in engagement so that the first motor 2 is rotated integrally with the sun gear 13 in the forward direction. Consequently, the torque is applied to the MOP 32 from the second input shaft 37.

Thus, in the vehicle Ve shown in FIG. 1, the engine 1 is connected to the power split device 12 but the MOP 32 may be driven in every situation (including forward propulsion, reverse propulsion, and stopping of the vehicle Ve). In addition, the clutch 17 may be used as a torque limiter by controlling the engagement pressure. By thus using the clutch 17 as a torque limiter, excessive application of torque to the transmission T can be prevented without using the torque limiter 6 and hence the transmission T may be downsized. Specifically, the flywheel 5 may be reduced diametrically.

Figure 11:
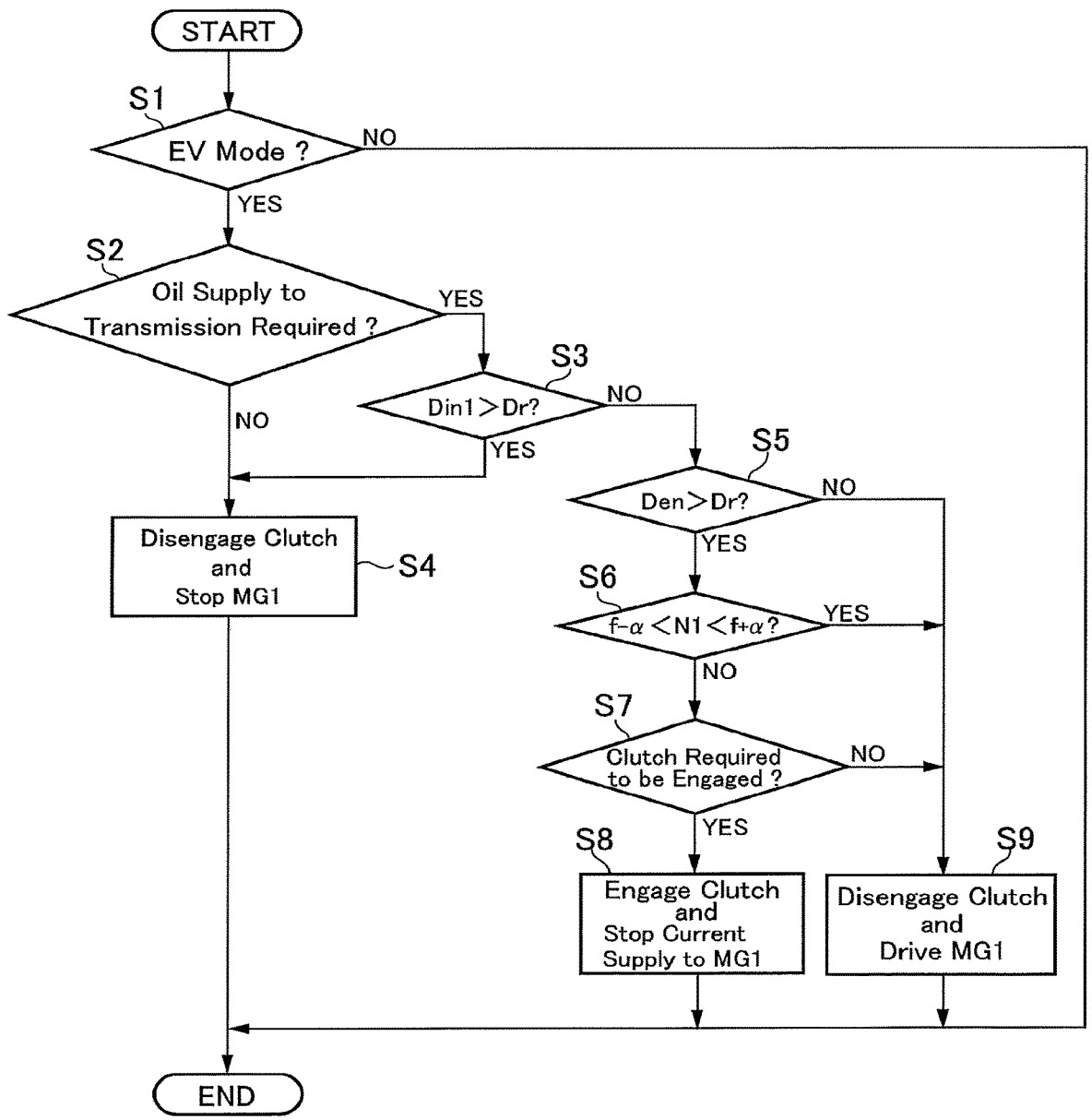
FIG. 11 is a flowchart showing an example of a routine for controlling the clutch and the first motor during propulsion in the EV mode.

Turning to FIG. 11, there is shown an example of a routine for controlling the clutch 17 and the first motor 2 to be executed by the ECU 39 during propulsion in the EV mode (in both forward propulsion and reverse propulsion). At step S1, it is determined whether or not the vehicle Ve is propelled in the EV mode. If the vehicle Ve is propelled in the HV mode or the vehicle Ve is stopped so that the answer of step S1 is NO, the routine terminates.

By contrast, if the vehicle Ve is propelled in the EV mode so that the answer of step S1 is YES, the routine progresses to step S2 to determine whether or not oil supply to the transmission T is required. At step S2, specifically, it is determined whether or not the gear train 18 has to be cooled or lubricated by the oil. For example, it is unnecessary to lubricate the gear train 18 in the following cases that the vehicle Ve is propelled in the reverse direction without applying large torque to the transmission T, and that the vehicle Ve is propelled in the forward direction or the reverse direction at a low speed while rotating the gears of the gear train 18 at a low speed. In those cases, accordingly, the answer of step S2 will be NO. In addition, a temperature of the gear train 18 will not be raised excessively if a driving time of the vehicle Ve is short and hence the answer of step S2 will also be NO in this case. Optionally, a temperature sensor may be arranged in the transmission T. In this case, the answer of step S2 will be NO if the temperature of the transmission T detected by the temperature sensor is lower than a threshold temperature. Alternatively, a torque sensor may also be arranged in the gear train 18 to detect torque of any of the rotary member of the gear train 18. In this case, the answer of step S2 will be NO if the torque of the rotary member of the gear train 18 detected by the torque sensor is smaller than a reference torque.

If the oil supply to the transmission T is required so that the answer of step S2 is YES, the routine progresses to step S3 to determine whether or not a discharge amount Din1 of the oil discharged from the MOP 32 by driving the MOP 32 by the first input shaft 30 is greater than a required discharge amount Dr of the oil discharged from the MOP 32. For example, the required discharge amount Dr may be determined based on a driving time of the vehicle Ve, a temperature of the transmission T, or a torque applied to the transmission T. On the other hand, the discharge amount Din1 may be obtained based on a rotational speed of the first input shaft 30 calculated based on a vehicle speed and a gear ratio of the power split device 12.

If it is not necessary to supply oil to the transmission T so that the answer of step S2 is NO, or if the discharge amount Din1 is greater than the required discharge amount Dr so that the answer of step S3 is YES, the routine progresses to step S4 to disengage the clutch 17 and stop the first motor 2. Thereafter, the routine terminates. In this case, the ring gear 14 is rotated at a speed governed by the vehicle speed so that the MOP 32 discharges the oil in accordance with the rotational speed of the ring gear 14.

By contrast, if the discharge amount Din1 is smaller than the required discharge amount Dr so that the answer of step S3 is NO, the routine progresses to step S5 to determine whether or not a discharge amount Den of the oil discharged from the MOP 32 in a case of engaging the clutch 17 is greater than the required discharge amount Dr of the oil discharged from the MOP 32. Specifically, the discharge amount Den may be obtained based on a rotational speed of the second input shaft 37 calculated based on a vehicle speed and the gear ratio of the power split device 12.

If the discharge amount Den is greater than the required discharge amount Dr so that the answer of step S5 is YES, the second input shaft 37 is rotated at a speed higher than that of the first input shaft 30. In this case, the routine progresses to step S6 to determine whether or not a speed N1 of the first motor 2 in a case of engaging the clutch 17 falls within a predetermined range a determined based on a natural vibration frequency f of the first motor 2. To this end, the natural vibration frequency f may be determined in advance based on a structure of the first motor 2.

If the speed N1 of the first motor 2 does not fall within the predetermined range a so that the answer of step S6 is NO, the routine progresses to step S7 to determine whether or not the clutch 17 is required to be engaged to satisfy another conditions. For example, the answer of step S7 will be YES if the operating mode of the vehicle Ve is expected to be shifted from the EV mode to the HV mode.

If the clutch 17 is required to be engaged to satisfy another conditions so that the answer of step S7 is YES, the routine progresses to step S8 to engage the clutch 17 and stop current supply to the first motor 2, and then the routine is terminates.

The routine progresses to step S9 if the discharge amount Den is smaller than the required discharge amount Dr so that the answer of step S5 is NO, if the speed N1 of the first motor 2 falls within the predetermined range a so that the answer of step S6 is YES, or if the clutch 17 is not required to be engaged to satisfy another conditions so that the answer of step S7 is NO. At step S9, the clutch 17 is disengaged, and the rotational speed of the first motor 2 is adjusted to a speed out of the predetermined range a at which an actual discharge amount Da of the oil discharged from the MOP 32 is increased to be greater than the required discharge amount Dr. Thereafter, the routine terminates.

Thus, the clutch 17 is disengaged in the case that it is unnecessary to supply oil to the transmission T, and in the case that the discharge amount Din1 of the oil discharged from the MOP 32 by driving the MOP 32 by the first input shaft 30 is greater than the required discharge amount Dr of the MOP 32. In those cases, the output power of the second motor 3 will not be consumed to change the rotational speed of the first motor 2 even partially. That is, a power loss during propulsion of the EV mode may be reduced. In addition, since the first motor 2 does not have to generate power to drive the MOP 32, electric consumption may be reduced.

Further, the clutch 17 is also disengaged in the case that the rotational speed of the first motor 3 falls within the predetermined range a as a result of engaging the clutch 17. In this case, the rotational speed of the first motor 2 is adjusted to the speed out of the predetermined range a. For this reason, noises and vibrations in the vehicle Ve resulting from vibrations of the first motor 2 may be suppressed.

Figure 12:
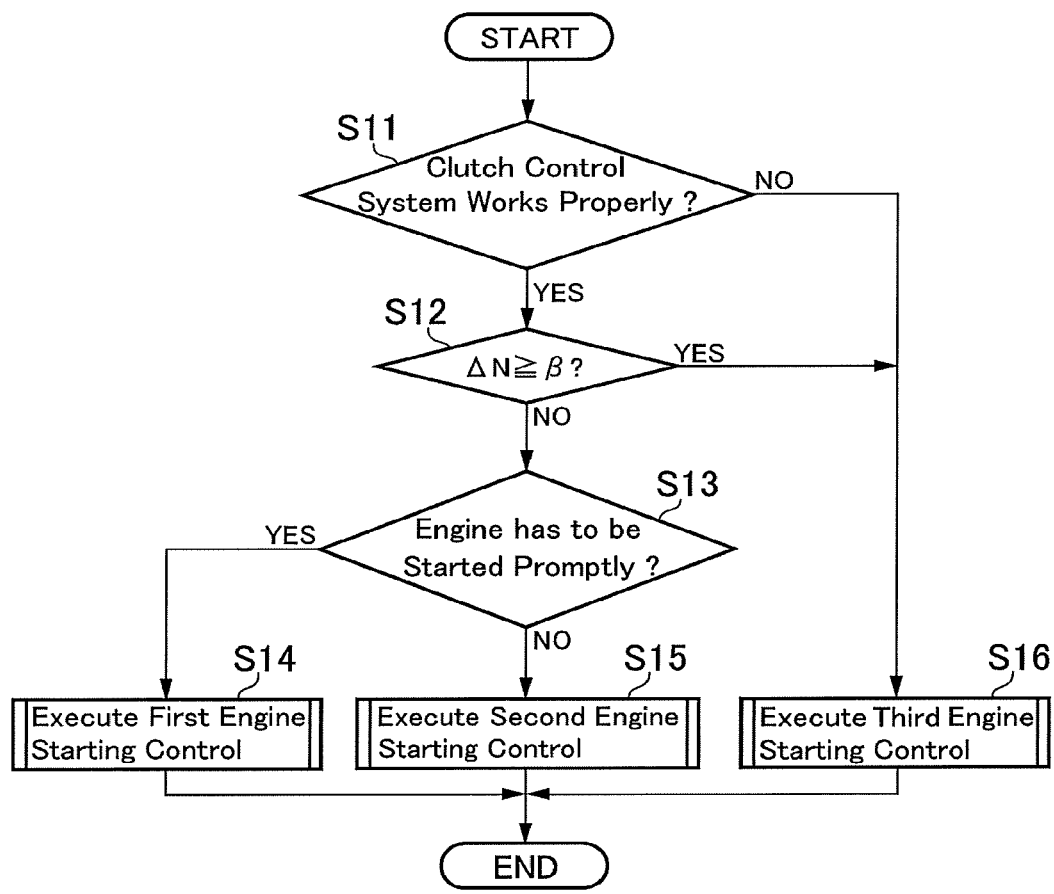
FIG. 12 is a flowchart showing an example of a routine for starting the engine when shifting the operating mode from the EV mode in which the clutch is disengaged to the HV mode.

In the hybrid vehicle Ve, the engine 1 is cranked by the torque of the first motor 2. To this end, the clutch 17 is engaged to deliver the torque of the first motor 2 to the engine 1. FIG. 12 shows a routine to be executed by the ECU 39 so as to select a pattern to start the engine 1 thereby shifting the operating mode from the EV mode to the HV mode. In the routine shown in FIG. 12, at step S11, it is determined whether or not a clutch control system works properly to adjust a torque transmitting capacity of the clutch 17 causing a slip to a desired capacity. For example, such determination at step S11 may be made based on a fact that an actual speed of the first motor 2 detected by the sensor is changed in line with a theoretical change in the speed of the first motor 2 governed by a command signal transmitted from the ECU 39. Even if the torque transmitting capacity of the clutch 17 cannot be controlled by the clutch control system, the routine shown in FIG. 12 will be continued if the ECU 39 determines that clutch 17 is still in a condition in which the first rotary member 17a and the second rotary member 17b can be engaged to each other completely and disengaged from each other completely.

If the clutch control system works properly so that the answer of step S11 is YES, the routine progresses to step S12 to determine whether or not a speed difference ΔN between the first rotary member 17a and the second rotary member 17b of the clutch 17 is equal to or greater than a threshold value β. The threshold value β is a slip limit value of the clutch 17, and the threshold value β may be determined based on heat resistance property of the clutch 17. Specifically, the speed difference ΔN may be obtained based on: a speed of the first motor 2 detected by the sensor; and a speed of the sun gear 13 obtained based on speeds of the vehicle Ve and the engine1 detected by the sensors, and the gear ratio of the power split device 12.

If the speed difference ΔN is smaller than the threshold value β so that the answer of step S12 is NO, the routine progresses to step S13 to determine whether or not it is necessary to start the engine 1 promptly. Such determination at step S13 may be made based on a fact that the accelerator pedal is depressed at a speed higher than a predetermined speed. In other words, at step S13, it is determined whether or not the engine 1 is required to be started promptly to generate high torque thereby accelerating the vehicle Ve quickly.

If the engine 1 is required to be started promptly so that the answer of step S13 is YES, the routine progresses to step S14 to execute an after-mentioned first engine starting control, and then the routine terminates. By contrast, if the engine 1 is not required to be started promptly so that the answer of step S13 is NO, the routine progresses to step S15 to execute an after-mentioned second engine starting control, and then the routine terminates.

If the clutch control system does not work properly so that the answer of step S11 is NO, or if the speed difference ΔN is equal to or greater than the threshold value β so that the answer of step S12 is YES, the routine progresses to step S16 to execute an after-mentioned third engine starting control, and then the routine terminates.

Figure 13:
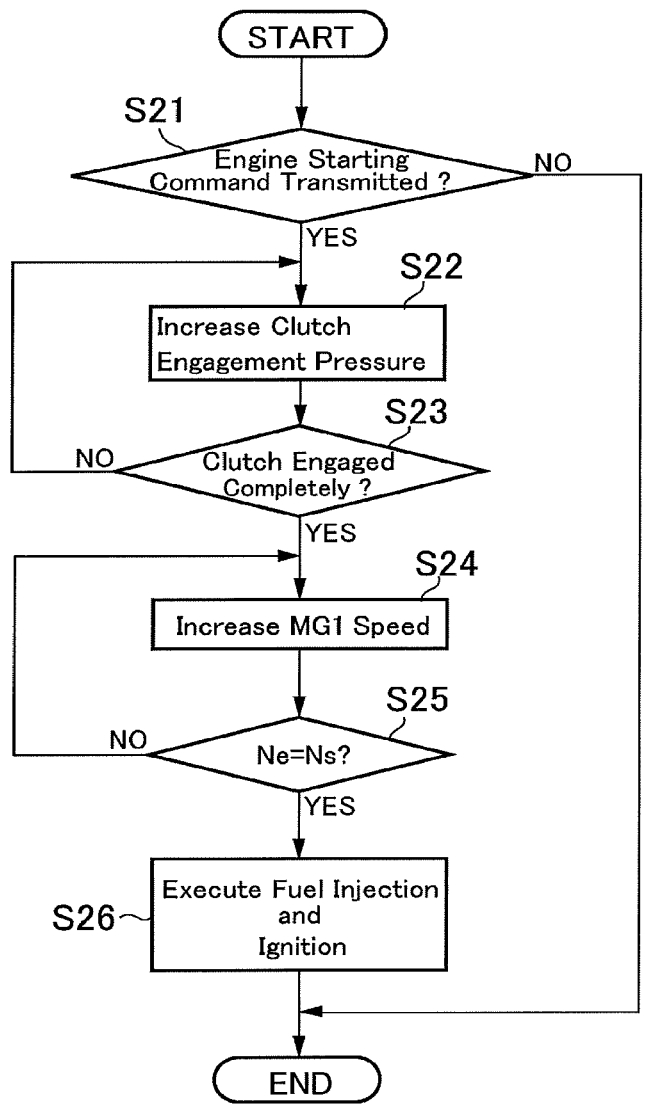
FIG. 13 is a flowchart showing a first engine starting control.

Turning to FIG. 13, there is shown a routine to execute the first engine starting control for starting the engine 1 promptly. At step S21, transmission of an engine starting command is determined. For example, such determination at step S21 may be made based on a fact that a flag to start the engine 1 is turned on upon satisfaction of the condition to shift the operating mode from the EV mode to the HV mode. If the engine starting command is not transmitted so that the answer of step S21 is NO, the routine terminates. By contrast, if the engine starting command is transmitted so that the answer of step S21 is YES, the routine progresses to step S22 to raise an engagement pressure applied to the clutch 17 at a rate to increase an engine speed Ne of the engine 1 at a desired rate. Consequently, the engine speed Ne is increased toward a starting speed (or a target speed) Ns with an increase in the engagement pressure applied to the clutch 17. In this situation, the first motor 2 is controlled in such a manner as to maintain the current speed.

Then, it is determined at step S23 whether or not the clutch 17 is engaged completely. At step S22, specifically, it is determined whether or not the speed of the sun gear 13 governed by the vehicle speed and the engine speed Ne is synchronized with the speed of the first motor 2.

If the clutch 17 has not yet engaged completely while causing a slip so that the answer of step S23 is NO, the routine returns to step S22 to raise the engagement pressure applied to the clutch 17 continuously. By contrast, if the clutch 17 has been engaged completely so that the answer of step S23 is YES, the routine progresses to step S24 to increase the speed of the first motor 2 at a rate to increase the engine speed Ne at a desired rate. Consequently, the engine speed Ne is further increased toward the starting speed Ns with an increase in the speed of the first motor 2.

Then, at step S25, it is determined whether or not the engine speed Ne is raised to the starting speed Ns.

If the engine speed Ne has not yet been raised to the starting speed Ns so that the answer of step S25 is NO, the routine returns to step S24 to raise the speed of the first motor 2 continuously. By contrast, if the engine speed Ne has been raised to the starting speed Ns so that the answer of step S25 is YES, the routine progresses to step S26 to execute fuel injection and ignition of the engine 1. Thereafter, the routine terminates.

Figure 14:
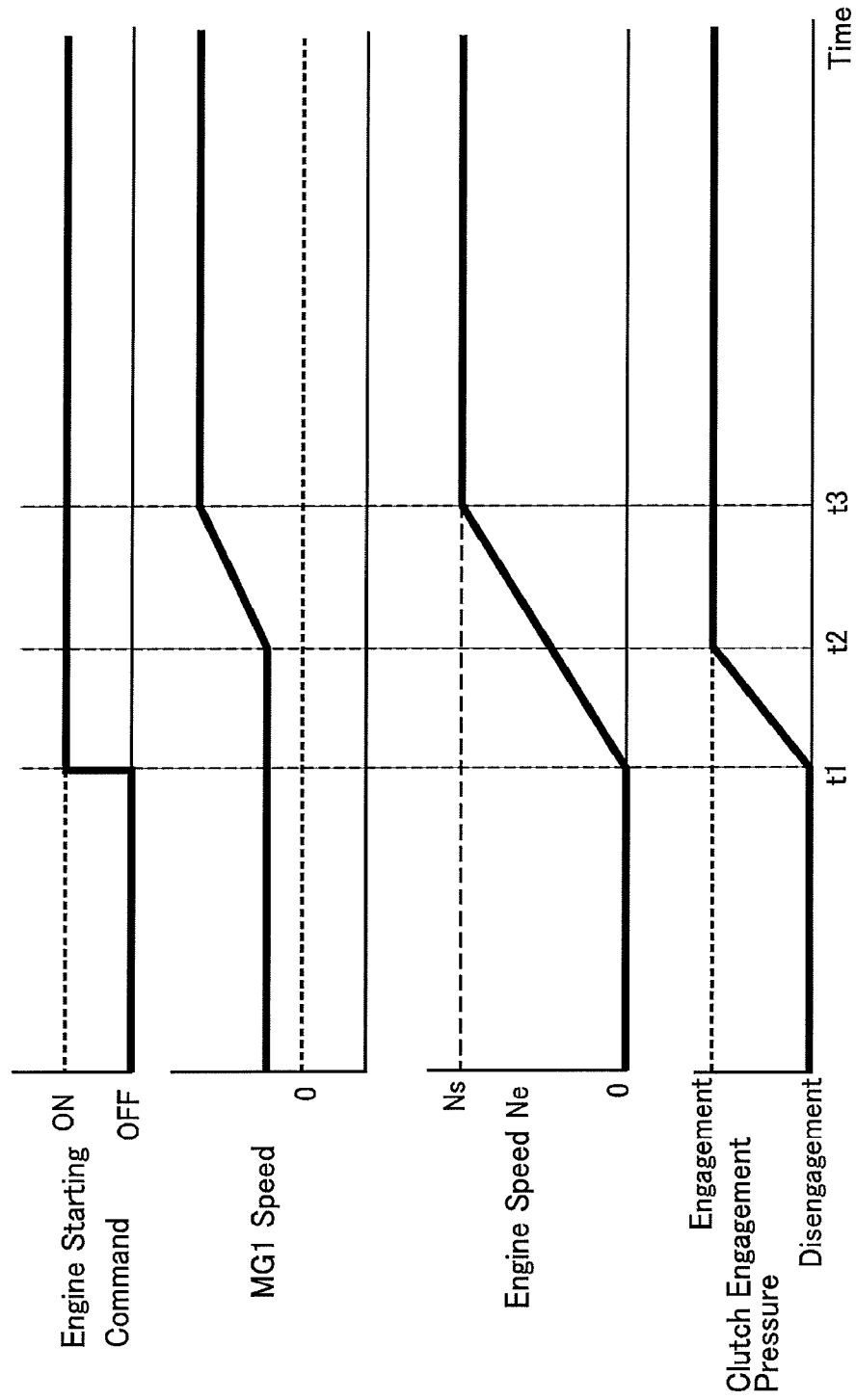
FIG. 14 is a time chart showing temporal changes in speeds of the first motor and the engine, and engagement pressure of the clutch during execution of the first engine starting control.

Temporal changes in the speed of the first motor 2, the engine speed Ne, and the engagement pressure applied to the clutch 17 in the case of starting the engine 1 by the first engine starting control are shown in FIG. 14.

During propulsion in the EV mode before point t1, the engine 1 is stopped, the clutch 17 is in disengagement, and the first motor 2 is rotated at a predetermined speed to drive the MOP 32. Conditions of the power split device 12, the first input shaft 30, and the second input shaft 37 in this situation are identical to those shown in FIG. 4. In this situation, the engine starting command is transmitted at point t1. Consequently, the engagement pressure applied to the clutch 17 is raised from point t1 while controlling the first motor 2 to maintain the current speed of the first motor 2. As a result, the engine speed Ne starts rising from point t1. As described, the engagement pressure applied to the clutch 17 is raised at the rate to increase the engine speed Ne of the engine 1 at the desired rate.

Figure 15:
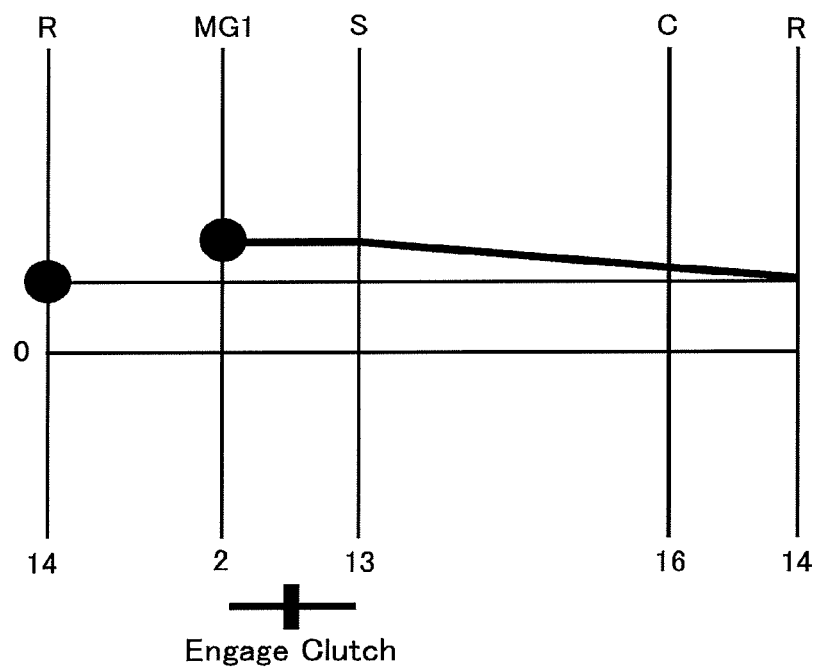
FIG. 15 is a nomographic diagram indicating speeds of the rotary elements and an engagement states at point t2 in FIG. 14.

Then, when the engagement pressure applied to the clutch 17 is raised to a predetermined level at point t2, the clutch 17 is engaged completely. Conditions of the power split device 12, the first input shaft 30, and the second input shaft 37 in this situation are identical to those shown in FIG. 15. In this situation, the engine speed Ne has not yet been raised to the starting speed Ns, that is, the engine speed Ne is still lower than that in the HV mode. Accordingly, the carrier 16 is rotated at a speed lower than that in the situation shown in FIG. 6. In this situation, the sun gear 13 and the second input shaft 37 are also rotated at speeds lower than those in the situation shown in FIG. 6, and the ring gear 14 is not rotated.

At point t2, the determination of complete engagement of the clutch 17 is made at step S23 of the routine shown in FIG. 13, and hence the speed of the first motor 2 is increased from point t2 at the rate to increase the engine speed Ne at the desired rate. In this situation, therefore, the engine speed Ne is increased continuously without changing the change rate. Then, when the engine speed Ne is raised to the starting speed Ns at point t3, the speed of the first motor 2 is maintained. Conditions of the power split device 12, the first input shaft 30, and the second input shaft 37 in this situation are identical to those shown in FIG. 16.

By thus engaging the clutch 17 first and then cranking the engine 1 by the first motor, the engine speed Ne may be raised promptly to the starting speed Ns upon transmission of the starting command. For this reason, the engine power may be delivered promptly to the drive wheels 19. That is, the vehicle Ve may be accelerated quickly.

Figure 16:
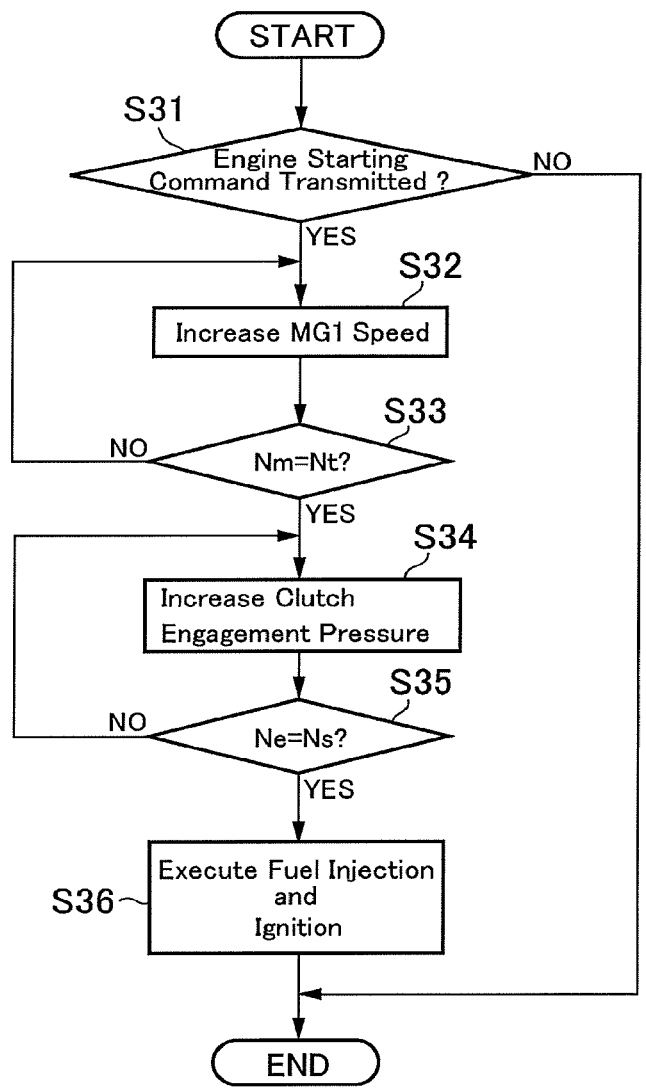
FIG. 16 is a flowchart showing a second engine starting control.

A routine to execute the second engine starting control is shown in FIG. 16. At step S31, transmission of the engine starting command is also determined. If the engine starting command is not transmitted so that the answer of step S31 is NO, the routine terminates. By contrast, if the engine starting command is transmitted so that the answer of step S31 is YES, the routine progresses to step S32 to increase a speed Nm of the first motor 2 to a target speed Nt to start the engine 1. Specifically, the target speed Nt of the first motor 2 is determined based on a speed of the sun gear 13 to be achieved when starting the engine 1 that is estimated based on a current speed of the ring gear 14, the engine starting speed Ns, and the gear ratio of the power split device 12. In this situation, since the clutch 17 is still in disengagement, drive force will not be changed even if the speed Nm of the first motor 2 is changed. For this reason, a change rate of the speed Nm of the first motor 2 may be set arbitrarily.

Then, it is determined at step S33 whether or not the speed Nm of the first motor 2 is raised to the target speed Nt based on an actual speed Nm of the first motor 2 detected by the sensor.

If the speed Nm of the first motor 2 has not yet been raised to the target speed Nt so that the answer of step S33 is NO, the routine returns to step S32. By contrast, if the speed Nm of the first motor 2 has been raised to the target speed Nt so that the answer of step S33 is YES, the routine progresses to step S34 to raise an engagement pressure applied to the clutch 17 at a rate to increase an engine speed Ne of the engine 1 at a desired rate. In this situation, the first motor 2 is controlled in such a manner as to maintain the current speed.

Then, at step S35, it is determined whether or not the engine speed Ne is raised to the starting speed Ns.

If the engine speed Ne has not yet been raised to the starting speed Ns so that the answer of step S35 is NO, the routine returns to step S34 to raise the engagement pressure applied to the clutch 17 continuously. By contrast, if the engine speed Ne has been raised to the starting speed Ns so that the answer of step S35 is YES, the routine progresses to step S36 to execute the fuel injection and the ignition of the engine 1.

Figure 17:
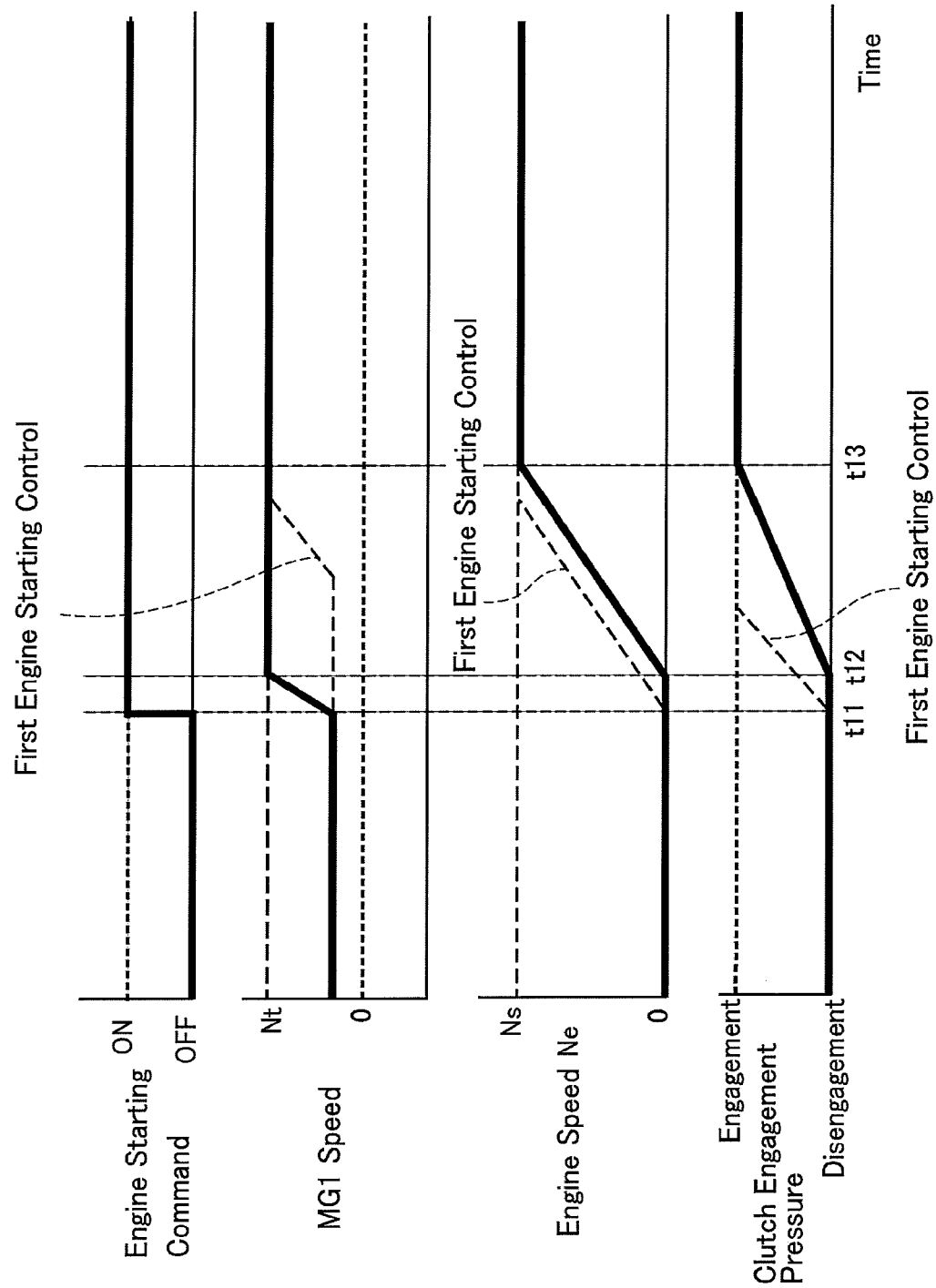
FIG. 17 is a time chart showing temporal changes in speeds of the first motor and the engine, and engagement pressure of the clutch during execution of the second engine starting control.

Temporal changes in the speed of the first motor 2, the engine speed Ne, and the engagement pressure applied to the clutch 17 in the case of starting the engine 1 by the second engine starting control are shown in FIG. 17. In FIG. 17, dashed lines individually represent the speed Nm of the first motor 2, the engine speed Ne, and the engagement pressure applied to the clutch 17 of the case in which the engine 1 is started by the first engine starting control.

During propulsion in the EV mode before point t11, the engine 1 is stopped, the clutch 17 is in disengagement, and the first motor 2 is rotated at a predetermined speed to drive the MOP 32. Conditions of the power split device 12, the first input shaft 30, and the second input shaft 37 in this situation are identical to those shown in FIG. 4. In this situation, the engine starting command is transmitted at point t11, and the speed Nm of the first motor 2 is increased from point t11. In this situation, since the clutch 17 is in disengagement, the engine 1 is still stopped.

Figure 18:
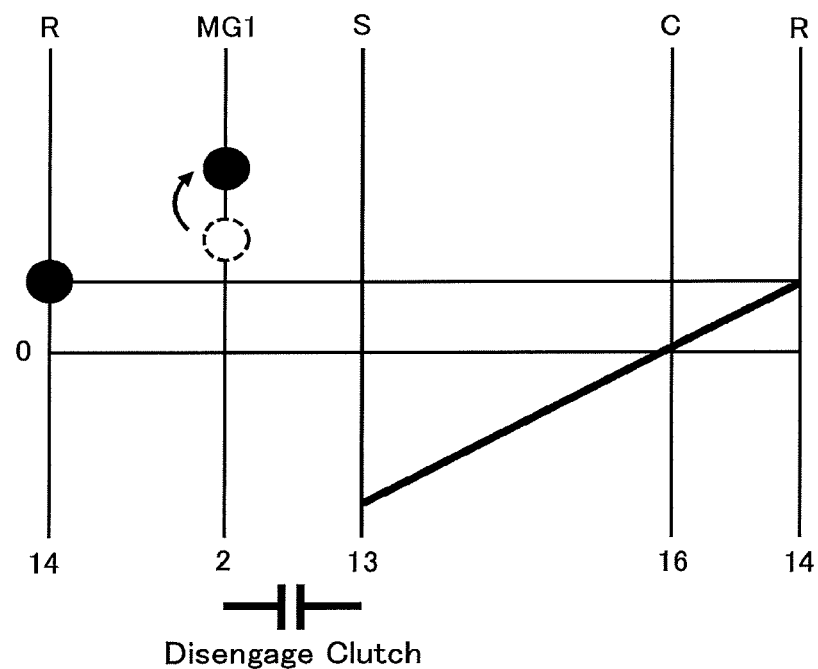
FIG. 18 is a nomographic diagram indicating speeds of the rotary elements and an engagement states at point t12 in FIG. 17.

Then, the speed Nm of the first motor 2 is raised to the target speed Nt at point t12. Conditions of the power split device 12, the first input shaft 30, and the second input shaft 37 in this situation are shown in FIG. 18. In FIG. 18, the dashed circle represents the speed Nm of the first motor 2 at point t11 before raised. In this situation, the sun gear 13, the ring gear 14, and the carrier 16 of the power split device 12 are rotated at the speeds shown in FIG. 4. On the other hand, the speed Nm of the first motor 2 is increased to the target speed Nt to start the engine 1. In FIG. 18, the speed Nm of the first motor 2 is indicated on the assumption that the speed Nm of the first motor 2 to achieve the required discharge amount Dr of the oil discharged from the MOP 32 is lower than the speed Nm to start the engine 1.

At point t12, the determination of increase in the speed Nm of the first motor 2 to the target speed Nt is made at step S33 of the routine shown in FIG. 16, and hence the engagement pressure applied to the clutch 17 is raised from point t12 at the rate to increase an engine speed Ne of the engine 1 at the desired rate. Consequently, the torque of the first motor 2 is applied to the engine 1 so that the engine speed Ne is raised from point t12. In this situation, the first motor 2 is controlled in such a manner as to maintain the current speed Nm. Then, when the engine speed Ne is raised to the starting speed Ns at point t13, the speed Nm of the first motor 2 is maintained. Conditions of the power split device 12, the first input shaft 30, and the second input shaft 37 in this situation are identical to those shown in FIG. 6.

By thus increasing the speed Nm of the first motor 2 first and then engaging the clutch 17 to start the engine 1, the speed Nm of the first motor 2 does not have to be controlled after increasing the engine speed Ne. For this reason, the control may be simplified while preventing a temporal change in the change rate of the engine speed Ne during cranking.

Figure 19:
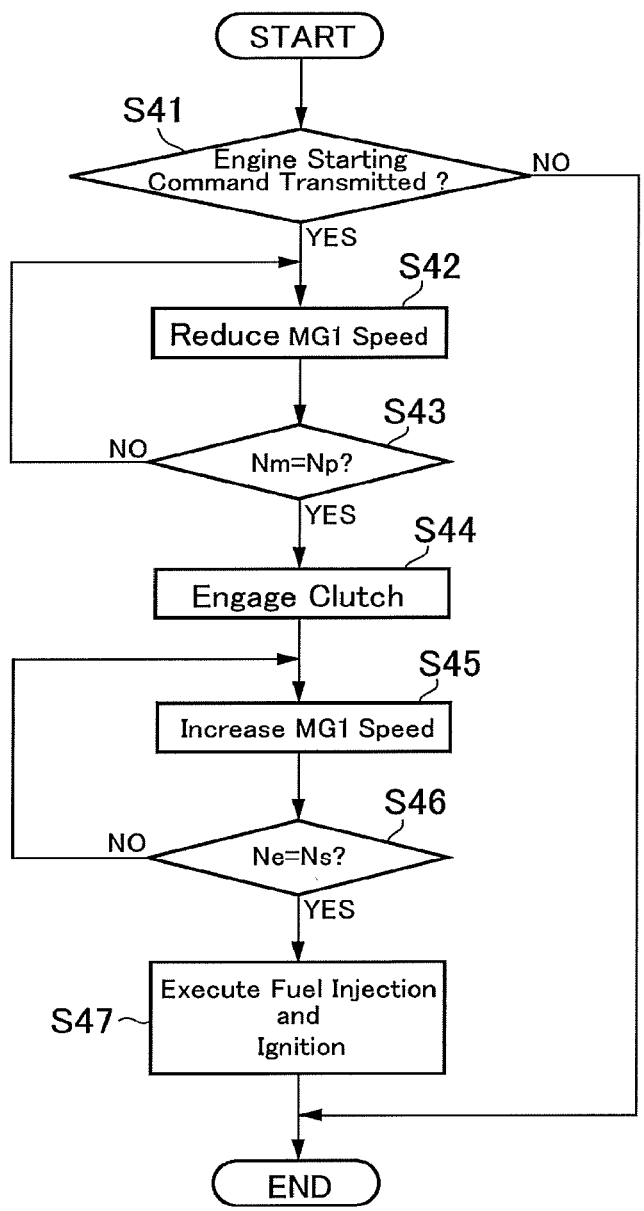
FIG. 19 is a flowchart showing a third engine starting control.

Turning to FIG. 19, there is shown a routine to execute the third engine starting control. At step S41, transmission of the engine starting command is also determined. If the engine starting command is not transmitted so that the answer of step S41 is NO, the routine terminates. By contrast, if the engine starting command is transmitted so that the answer of step S41 is YES, the routine progresses to step S42 to reduce the speed Nm of the first motor 2 to a current speed Np of the sun gear 13. In other words, at step S42, the speed Nm of the first motor 2 is synchronized with the current speed Np of the sun gear 13. To this end, the current speed Np of the sun gear 13 may be obtained based on the current speed of the ring gear 14, the current engine speed Ne, and the gear ratio of the power split device 12. In this situation, since the clutch 17 is still in disengagement, drive force will not be changed even if the speed Nm of the first motor 2 is changed. For this reason, a change rate of the speed Nm of the first motor 2 may be set arbitrarily.

Then, it is determined at step S43 whether or not the speed Nm of the first motor 2 is synchronized with the current speed Np of the sun gear 13 based on an actual speed of the first motor 2 Nm detected by the sensor.

If the speed Nm of the first motor 2 has not yet been synchronized with the current speed Np of the sun gear 13 so that the answer of step S43 is NO, the routine returns to step S42 to reduce the speed Nm of the first motor 2 continuously. By contrast, if the speed Nm of the first motor 2 has been synchronized with the current speed Np of the sun gear 13 so that the answer of step S43 is YES, the routine progresses to step S44 to engage the clutch 17. In this situation, since the speed Nm of the first motor 2 has been synchronized with the current speed Np of the sun gear 13, an engagement shock of the clutch 17 may be reduced even if the clutch 17 is engaged abruptly. In this situation, therefore, it is preferable to raise the engagement pressure applied to the clutch 17 abruptly to bring the clutch 17 into complete engagement promptly so as to start the engine 1 promptly.

Then, at step S45, the speed Nm of the first motor 2 is increased at the rate to increase the engine speed Ne at the desired rate. Consequently, the engine speed Ne is further increased with an increase in the speed Nm of the first motor 2.

Then, at step S46, it is determined whether or not the engine speed Ne is raised to the starting speed Ns.

If the engine speed Ne has not yet been raised to the starting speed Ns so that the answer of step S46 is NO, the routine returns to step S45 to increase the speed Nm of the first motor 2 continuously. By contrast, if the engine speed Ne has been raised to the starting speed Ns so that the answer of step S46 is YES, the routine progresses to step S47 to execute the fuel injection and the ignition of the engine 1.

Figure 20:
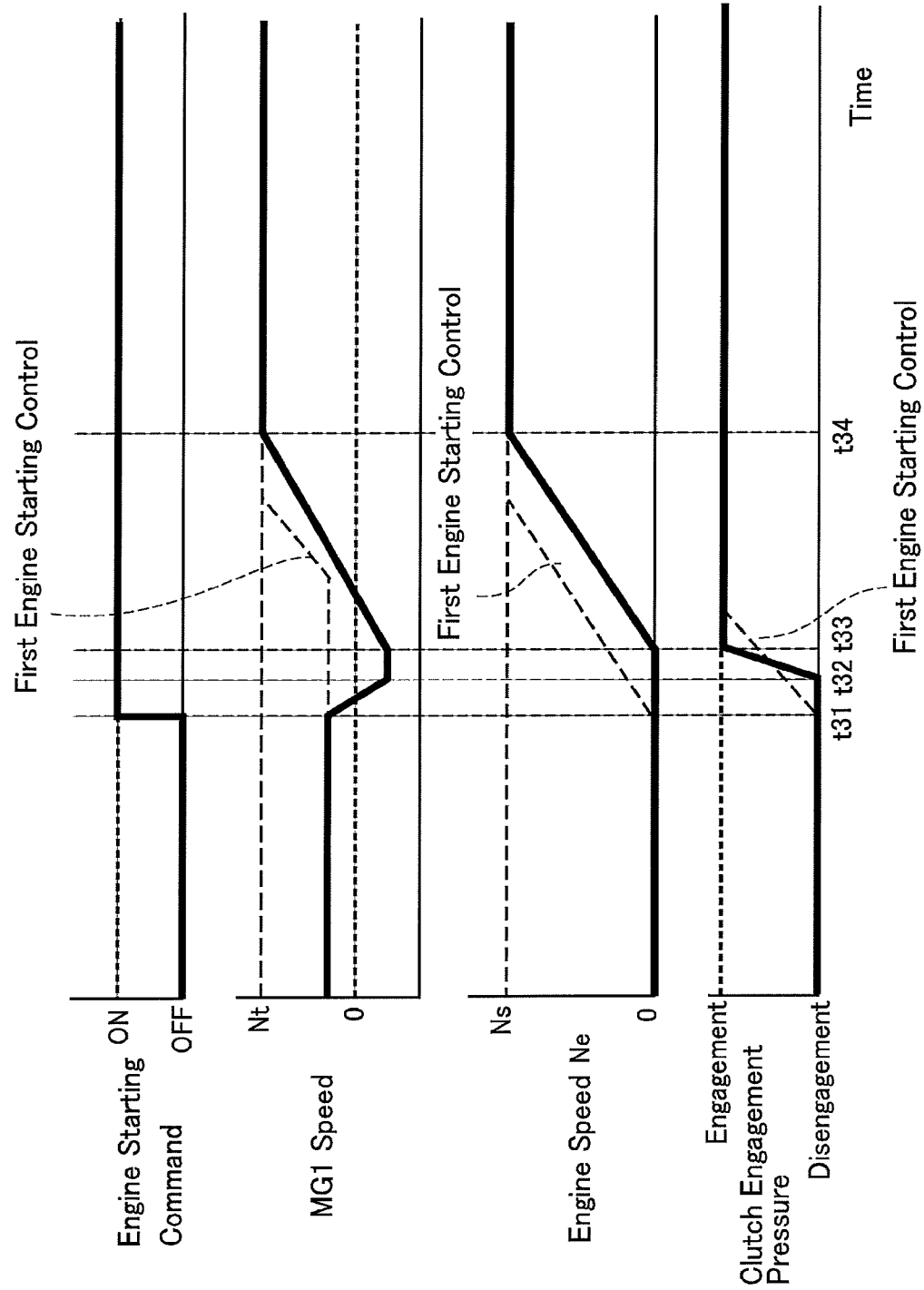
FIG. 20 is a time chart showing temporal changes in speeds of the first motor and the engine, and engagement pressure of the clutch during execution of the third engine starting control.

Temporal changes in the speed of the first motor 2, the engine speed Ne, and the engagement pressure applied to the clutch 17 in the case of starting the engine 1 by the third engine starting control are shown in FIG. 20. In FIG. 20, dashed lines individually represent the speed Nm of the first motor 2, the engine speed Ne, and the engagement pressure applied to the clutch 17 of the case in which the engine 1 is started by the first engine starting control.

During propulsion in the EV mode before point t31, the engine 1 is stopped, the clutch 17 is in disengagement, and the first motor 2 is rotated at a predetermined speed to drive the MOP 32. Conditions of the power split device 12, the first input shaft 30, and the second input shaft 37 in this situation are identical to those shown in FIG. 4. In this situation, the engine starting command is transmitted at point t31, and the speed Nm of the first motor 2 is reduced from point t31. In this situation, since the clutch 17 is in disengagement, the engine 1 is still stopped.

Then, when the speed Nm of the first motor 2 is reduced to the current speed Np of the sun gear 13 at point t32, the determination of synchronization of the speed Nm with the speed Np is made at step S43 of the routine shown in FIG. 19, and then the clutch 17 is engaged at point t33. Conditions of the power split device 12, the first input shaft 30, and the second input shaft 37 in this situation are identical to those shown in FIG. 5.

When the clutch 17 is engaged at point t33, the speed Ne of the first motor 2 is raised from point t33. Consequently, torque of the first motor 2 is applied to the engine 1 so that the engine speed Ne is raised from point t33. In this situation, the first motor 2 is controlled in such a manner that the engine speed Ne is raised at the desired rate. Then, when the engine speed Ne is raised to the starting speed Ns at point t34, the speed Ne of the first motor 2 is maintained. Conditions of the power split device 12, the first input shaft 30, and the second input shaft 37 in this situation are identical to those shown in FIG. 6.

By thus synchronizing the speed Nm of the first motor 2 with the current speed Np of the sun gear 13 first, then engaging the clutch 17, and thereafter increasing the speed Nm of the first motor 2 to start the engine 1, engagement shock of the clutch 17 may be reduced even if the clutch control system does not work properly. In addition, since the clutch 17 is engaged without causing a slip, the clutch 17 may be prevented from being heated excessively. That is, damage on the clutch 17 can be limited. For this reason, a clutch the heat resistance thereof is not so high may be used as the clutch 17.

Although the above exemplary embodiments of the present application have been described, it will be understood by those skilled in the art that the present application should not be limited to the described exemplary embodiments, and various changes and modifications can be made within the spirit and scope of the present application. For example, the first input shaft 30 may also be connected to the sun gear 13 or the carrier 16 instead of the ring gear 14. In this case, the sun gear 13 will be rotated in the counter direction and the carrier 16 is stopped during propulsion in the EV mode, therefore, torque may not be applied to the MOP 32 from the first input shaft 30. In the hybrid vehicle thus modified, in order to drive the MOP 32 in any of the operating mode irrespective of travelling direction, the clutch 17 is disengaged and the first motor 2 is driven during propulsion in the EV mode.

In the hybrid vehicle thus modified, a speed difference between the first rotary member 17a and the second rotary member 17b may be increased when engaging the clutch 17, and hence the rotational speed of the first rotary member 17a is synchronized with the rotational speed of the second rotary member 17b while rotating the first motor 2 in the counter direction. In this situation, however, torque transmission to the MOP 32 is stopped when the first motor 2 starts rotating in the counter direction and hence the MOP 32 is inactivated temporarily. On the other hand, in the vehicle Ve according to the embodiment, the first input shaft 30 is connected to the ring gear 14 so that the MOP 32 is driven continuously by the ring gear 14 even during the synchronization of the clutch 17. For this reason, it is preferable to connect the first input shaft 30 to the ring gear 14.

What is claimed is:

1. A hybrid vehicle, comprising:
an engine;
a first motor;
a differential mechanism including a first rotary element to which torque is delivered from the engine, a second rotary element connected to drive wheels, and a third rotary element to which torque is delivered from the first motor;
a second motor that applies torque to a power transmitting route between the second rotary element and the drive wheels;
wherein an operating mode is switched between a hybrid mode in which an output torque of the engine is delivered to the drive wheels through the differential mechanism to propel the hybrid vehicle, and an electric vehicle mode in which an output torque of the second motor is delivered to the drive wheels to propel the hybrid vehicle while stopping the engine;
a clutch that selectively interrupts torque transmission between the first motor and the third rotary element;
a first input shaft connected to any one of the rotary elements of the differential mechanism;
a second input shaft connected to the first motor;
a mechanical oil pump that is driven by the torque applied from any one of the first input shaft and the second input shaft that is rotated at a speed higher than that of the other one; and
a controller that controls the clutch and the first motor,
wherein the first input shaft is connected to the second rotary element, and
wherein the controller is further configured to:
determine whether or not a discharge amount of the oil discharged from the mechanical oil pump in a case of engaging the clutch is greater than a required discharge amount of the oil discharged from the mechanical oil pump during propulsion in the electric vehicle mode; and
disengage the clutch and drive the first motor in a case that the discharge amount of the oil discharged from the mechanical oil pump in the case of engaging the clutch during propulsion in the electric vehicle mode is smaller than the required discharge amount of the oil discharged from the mechanical oil pump.

2. The hybrid vehicle as claimed in claim 1, wherein the mechanical oil pump includes:
a first one-way clutch that is engaged to transmit torque when the first input shaft is rotated in a predetermined direction;
a second one-way clutch that is engaged to transmit torque when the second input shaft is rotated in a predetermined direction; and a driveshaft that is connected to the first input shaft through the first one-way clutch, and that is connected to the second input shaft through the second one-way clutch.

3. The hybrid vehicle as claimed in claim 2, wherein an engagement direction of the first one-way clutch and an engagement direction of the second one-way clutch are identical to each other.

4. The hybrid vehicle as claimed in claim 1, wherein the controller is further configured to:
disengage the clutch and stop the first motor in a case that the discharge amount of oil discharged from the mechanical oil pump during propulsion in the electric vehicle mode is greater than the required discharge amount of the oil discharged from the mechanical oil pump.

5. The hybrid vehicle as claimed in claim 1, wherein the controller is further configured to:
determine whether or not oil supply from the mechanical oil pump is required during propulsion in the electric vehicle mode; and
disengage the clutch and stop the first motor in a case that oil supply from the mechanical oil pump is not required during propulsion in the electric vehicle mode.

6. The hybrid vehicle as claimed in claim 1, wherein the controller is further configured to:
determine whether or not a speed of the first motor in the case of engaging the clutch during propulsion in the electric vehicle mode falls within a predetermined range determined based on a natural vibration frequency of the first motor; and
disengage the clutch and drive the first motor in a case that the speed of the first motor in the case of engaging the clutch falls within the predetermined range.

7. The hybrid vehicle as claimed in claim 1,
wherein the clutch includes a first rotary member connected to the first motor, and a second rotary member connected to the third rotary element, and
wherein a torque transmitting capacity between the first rotary member and the second rotary member is variable.

8. The hybrid vehicle as claimed in claim 7, wherein the controller is further configured to:
determine whether or not a torque transmitting capacity of the clutch can be adjusted by causing a slip between the first rotary member and the second rotary member; and
start the engine by engaging the first rotary member with the second rotary member after synchronizing a speed of the first rotary member with a speed of the second rotary member by controlling a speed of the first motor, and thereafter increasing a speed of the engine to a predetermined speed by controlling the speed of the first motor, in a case that the torque transmitting capacity of the clutch cannot be adjusted.

9. The hybrid vehicle as claimed in claim 7, wherein the controller is further configured to:
determine whether or not a speed difference between the first rotary member and the second rotary member is equal to or greater than a threshold value; and
start the engine by engaging the first rotary member with the second rotary member after synchronizing a speed of the first rotary member with a speed of the second rotary member by controlling a speed of the first motor, and thereafter increasing a speed of the engine to a predetermined speed by controlling the speed of the first motor, in a case that the speed difference between the first rotary member and the second rotary member is equal to or greater than the threshold value.

10. The hybrid vehicle as claimed in claim 7, wherein the controller is further configured to:
determine whether or not the engine is required to be started promptly; and
start the engine by engaging the clutch while maintaining a current speed of the first motor, and thereafter changing the speed of the first motor in such a manner as to raise the speed of the engine to an engine starting speed, in a case that the engine is required to be started promptly.

11. The hybrid vehicle as claimed in claim 7, wherein the controller is further configured to:
determine whether or not the engine is required to be started promptly; and
start the engine by changing the speed of the first motor to a target speed to start the engine while disengaging the clutch, and thereafter engaging the clutch while maintaining the speed of the first motor to the target speed, in a case that the engine is not required to be started promptly.

12. A hybrid vehicle, comprising:
an engine;
a first motor;
a differential mechanism including a first rotary element to which torque is delivered from the engine, a second rotary element connected to drive wheels, and a third rotary element to which torque is delivered from the first motor;
a second motor that applies torque to a power transmitting route between the second rotary element and the drive wheels;
wherein an operating mode is switched between a hybrid mode in which an output torque of the engine is delivered to the drive wheels through the differential mechanism to propel the hybrid vehicle, and an electric vehicle mode in which an output torque of the second motor is delivered to the drive wheels to propel the hybrid vehicle while stopping the engine;
a clutch that selectively interrupts torque transmission between the first motor and the third rotary element;
a first input shaft connected to any one of the rotary elements of the differential mechanism;
a second input shaft connected to the first motor;
a mechanical oil pump that is driven by the torque applied from any one of the first input shaft and the second input shaft that is rotated at a speed higher than that of the other one; and
a controller that controls the clutch and the first motor,
wherein the first input shaft is connected to the second rotary element,
wherein the clutch includes a first rotary member connected to the first motor, and a second rotary member connected to the third rotary element,
wherein a torque transmitting capacity between the first rotary member and the second rotary member is variable, and
wherein the controller is further configured to:
determine whether or not the engine is required to be started promptly; and
start the engine by changing the speed of the first motor to a target speed to start the engine while disengaging the clutch, and thereafter engaging the clutch while maintaining the speed of the first motor to the target speed, in a case that the engine is not required to be started promptly.

13. The hybrid vehicle as claimed in claim 12, wherein the mechanical oil pump includes:
- a first one-way clutch that is engaged to transmit torque when the first input shaft is rotated in a predetermined direction;
- a second one-way clutch that is engaged to transmit torque when the second input shaft is rotated in a predetermined direction; and
- a driveshaft that is connected to the first input shaft through the first one-way clutch, and that is connected to the second input shaft through the second one-way clutch.

14. The hybrid vehicle as claimed in claim 13, wherein an engagement direction of the first one-way clutch and an engagement direction of the second one-way clutch are identical to each other.

15. The hybrid vehicle as claimed in claim 12, wherein the controller is further configured to:
- determine whether or not a discharge amount of oil discharged from the mechanical oil pump by driving the mechanical oil pump by torque of the first input shaft is greater than a required discharge amount of the oil discharged from the mechanical oil pump during propulsion in the electric vehicle mode; and
- disengage the clutch and stop the first motor in a case that the discharge amount of oil discharged from the mechanical oil pump by driving the mechanical oil pump by the torque of the first input shaft during propulsion in the electric vehicle mode is greater than the required discharge amount of the oil discharged from the mechanical oil pump.

16. The hybrid vehicle as claimed in claim 12, wherein the controller is further configured to:
- determine whether or not oil supply from the mechanical oil pump is required during propulsion in the electric vehicle mode; and
- disengage the clutch and stop the first motor in a case that oil supply from the mechanical oil pump is not required during propulsion in the electric vehicle mode.

17. The hybrid vehicle as claimed in claim 12, wherein the controller is further configured to:
- determine whether or not a torque transmitting capacity of the clutch can be adjusted by causing a slip between the first rotary member and the second rotary member; and
- start the engine by engaging the first rotary member with the second rotary member after synchronizing a speed of the first rotary member with a speed of the second rotary member by controlling a speed of the first motor, and thereafter increasing a speed of the engine to a predetermined speed by controlling the speed of the first motor, in a case that the torque transmitting capacity of the clutch cannot be adjusted.

18. The hybrid vehicle as claimed in claim 12, wherein the controller is further configured to:
- determine whether or not a speed difference between the first rotary member and the second rotary member is equal to or greater than a threshold value; and
- start the engine by engaging the first rotary member with the second rotary member after synchronizing a speed of the first rotary member with a speed of the second rotary member by controlling a speed of the first motor, and thereafter increasing a speed of the engine to a predetermined speed by controlling the speed of the first motor, in a case that the speed difference between the first rotary member and the second rotary member is equal to or greater than the threshold value.

19. The hybrid vehicle as claimed in claim 12, wherein the controller is further configured to:
- start the engine by engaging the clutch while maintaining a current speed of the first motor, and thereafter changing the speed of the first motor in such a manner as to raise the speed of the engine to an engine starting speed, in a case that the engine is required to be started promptly.

* * * * *